US012784761B1

(12) United States Patent
Garcia et al.

(10) Patent No.: US 12,784,761 B1
(45) Date of Patent: Nov. 3, 2026

(54) AMBIENT NOISE TRACKING USING SIGNAL STATIONARITY

(71) Applicant: Amazon Technologies, Inc., Seattle, WA (US)

(72) Inventors: Guillermo Daniel Garcia, Kensington, CA (US); Mazher Ali Khan, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 159 days.

(21) Appl. No.: 18/951,114

(22) Filed: Nov. 18, 2024

(51) Int. Cl.
*G10L 21/0216* (2013.01)
*G10L 15/02* (2006.01)

(52) U.S. Cl.
CPC .......... *G10L 21/0216* (2013.01); *G10L 15/02* (2013.01)

(58) Field of Classification Search
CPC ............................ G10L 21/0216; G10L 15/02
See application file for complete search history.

(56) References Cited

U.S. PATENT DOCUMENTS

2014/0016791 A1* 1/2014 Smith ...................... H03G 3/32
381/57

FOREIGN PATENT DOCUMENTS

CN 113504891 A * 10/2021 .......... G06F 18/253

OTHER PUBLICATIONS

Soeta et al.; Effects of noise level and type of music on listening level of music through headphones in a train car; National Institute of Advanced Industrial Science and Technology (AIST), 1-8-31 Midorigaoka, Ikeda, Osaka; Sep. 4-7, 2011; pp. 1-6. (Year: 2011).*

* cited by examiner

*Primary Examiner* — Abul K Azad
(74) *Attorney, Agent, or Firm* — Pierce Atwood LLP

(57) ABSTRACT

A system configured to improve noise estimation while performing noise dependent volume control to reduce a sensitivity to voice activity and other non-stationary sounds. For example, a device may adaptively increase a volume level of playback audio based on an amount of ambient noise present in a noisy environment, with an amount of noise compensation determined based on an estimated noise level. To avoid overestimating the noise level during periods of voice activity (e.g., speech), loud transient sounds (e.g., slamming doors, coughing), and/or residual acoustic echo, the device may adaptively slow a noise tracking speed for non-stationary signals. For example, the device may extract features that distinguish between stationary signals and non-stationary signals and calculate a stationarity coefficient to adaptively control noise estimation. Thus, the device may use a normal noise tracking speed for stationary signals and a slower noise tracking speed for non-stationary signals.

20 Claims, 16 Drawing Sheets

FIG. 5

Volume Table
500

| | Value (dB) |
|---|---|
| 0 | 0 |
| 1 | -2 |
| 2 | -4 |
| 3 | -6 |
| 4 | -8 |
| 5 | -10 |
| ... | ... |
| 28 | -66 |
| 29 | -70 |
| 30 | -200 |

FIG. 9

Power Smoothing Coefficient
910 $$\alpha_p = 1 - e^{-(N_F/(\tau_P \cdot f_S))}$$

Dynamic Range Smoothing Coefficient
912 $$\alpha_{DR} = 1 - e^{-(N_F/(\tau_{DR} \cdot f_S))}$$

Frame Power Value
920 $$P(n) = \frac{|X(n)|^2}{N_F}$$

Mean Power Value
922 $$\bar{P}(n) = \bar{P}(n-1) + \alpha_p\left(P(n) - \bar{P}(n-1)\right)$$

Frame Power Value (dB)
924 $$P_{dB}(n) = 10\log_{10}\left(P(n)\right)$$

Mean Power Value (dB)
926 $$\bar{P}_{dB}(n) = 10\log_{10}\left(\bar{P}(n)\right)$$

Frame Level Deviation from Mean
930 $$\Delta_P(n) = |P_{dB}(n) - \bar{P}_{dB}(n)|$$

Short-Term Dynamic Range
932 $$\mathrm{DR}(\mathrm{n}) = \mathrm{DR}(\mathrm{n}-1) + \alpha_{DR}(\Delta_P(n) - DR(n-1))$$

Centroid Smoothing Coefficient
914 $$\alpha_C = 1 - e^{-(N_F/(\tau_C \cdot f_S))}$$

Centroid Deviation Smoothing Coefficient
916 $$\alpha_{\Delta C} = 1 - e^{-(N_F/(\tau_{\Delta C} \cdot f_S))}$$

Spectral Centroid
940 $$C(n) = \frac{\sum_{k=0}^{K-1} k|X(k)|^2}{\sum_{k=0}^{K-1}|X(k)|^2}$$

Mean Spectral Centroid
942 $$\bar{C}(n) = \bar{C}(n-1) + \alpha_C\left(C(n) - \bar{C}(n-1)\right)$$

Spectral Centroid Deviation Relative to Mean
950 $$\Delta_C(n) = \left|\frac{C(n) - \bar{C}(n)}{\bar{C}(n)}\right|$$

Average Spectral Centroid Relative Deviation
952 $$\bar{\Delta}_C(n) = \bar{\Delta}_C(n-1) + \alpha_{\Delta C}\left(\Delta_C(n) - \bar{\Delta}_C(n-1)\right)$$

Stationarity Coefficient Value
960 $$\beta_S = |0.5(\beta_C + \beta_{DR})|^2$$

Feature Example 1110

FIG. 12
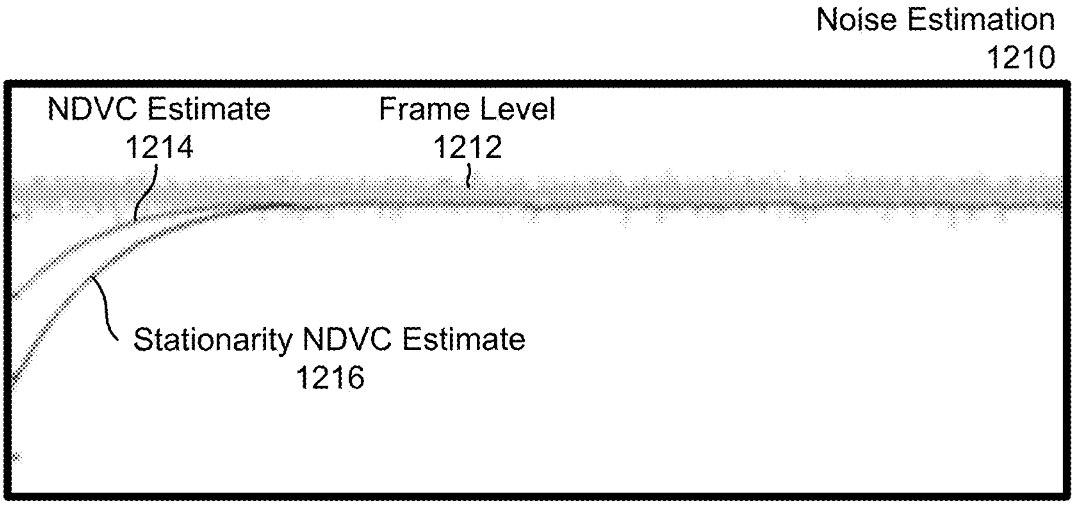
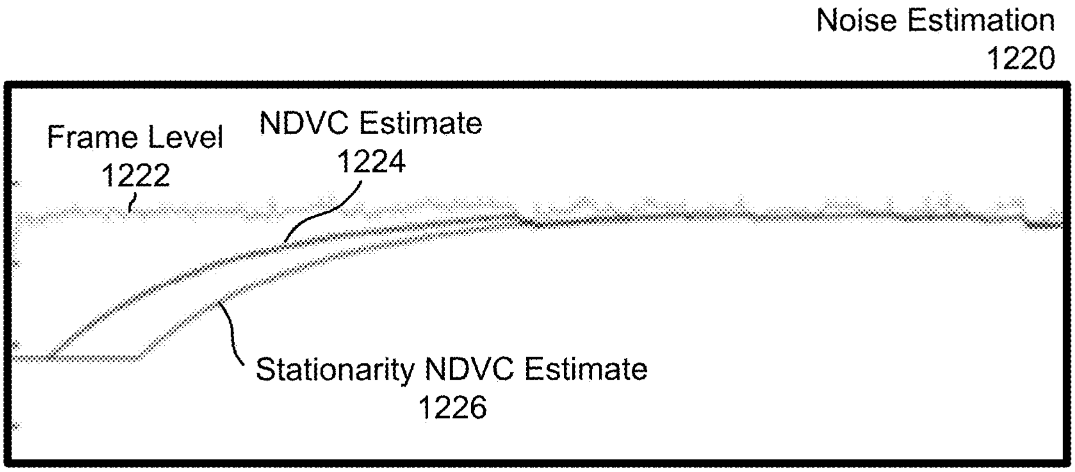
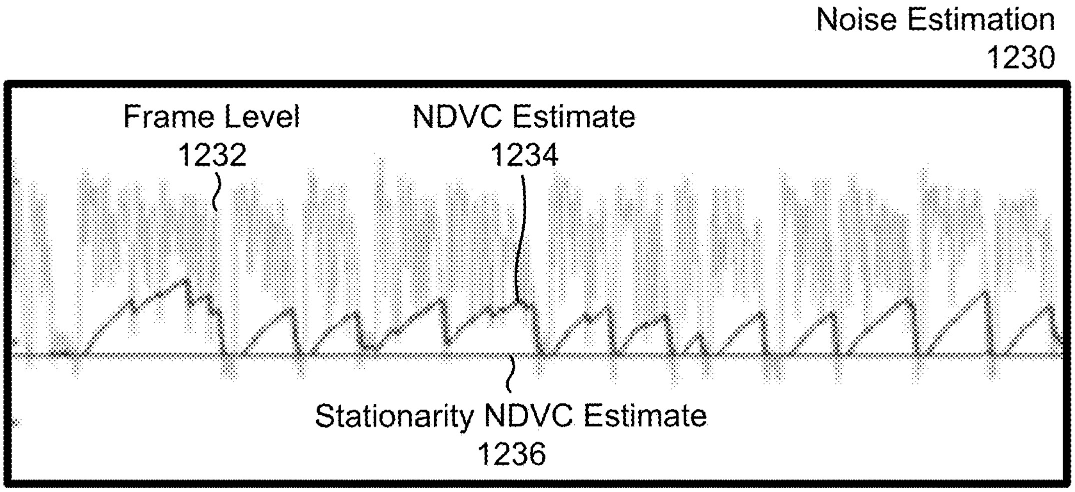

AMBIENT NOISE TRACKING USING SIGNAL STATIONARITY

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 5 illustrates an example of a quantized volume table according to embodiments of the present disclosure.

FIG. 9 illustrates an example of calculating features and determining a stationarity coefficient according to embodiments of the present disclosure.

FIG. 12 illustrates examples of noise estimates generated with and without a stationary coefficient according to embodiments of the present disclosure.

DETAILED DESCRIPTION

Electronic devices may be used to capture input audio and output playback audio. For example, a device may include one or more microphones configured to capture input audio and generate microphone audio data. In addition, the device may be configured to receive playback audio data and generate playback audio using one or more loudspeakers. For example, the device may generate playback audio corresponding to a communication session or media content, such as music, a movie, and/or the like.

When the device generates playback audio in a quiet environment, a user of the device may perceive the playback audio clearly. However, a noisy environment may decrease intelligibility of speech and/or clarity of music or other content. To combat this issue, the device may perform noise dependent volume control to increase a volume level of the playback audio in a noisy environment. For example, the device may adaptively increase gain based on an amount of ambient noise present in the environment. However, an estimate of the ambient noise may suffer from overestimation during periods of voice activity, loud transient sounds, and/or when residual acoustic echo is present during music playback. Overestimating the ambient noise may negatively impact a customer experience, as it may cause undesired fluctuations in playback volume or even volume runaway caused by a feedback loop. For example, the volume level may increase drastically during normal conversation and/or in response to temporary disturbances.

Figure 1:
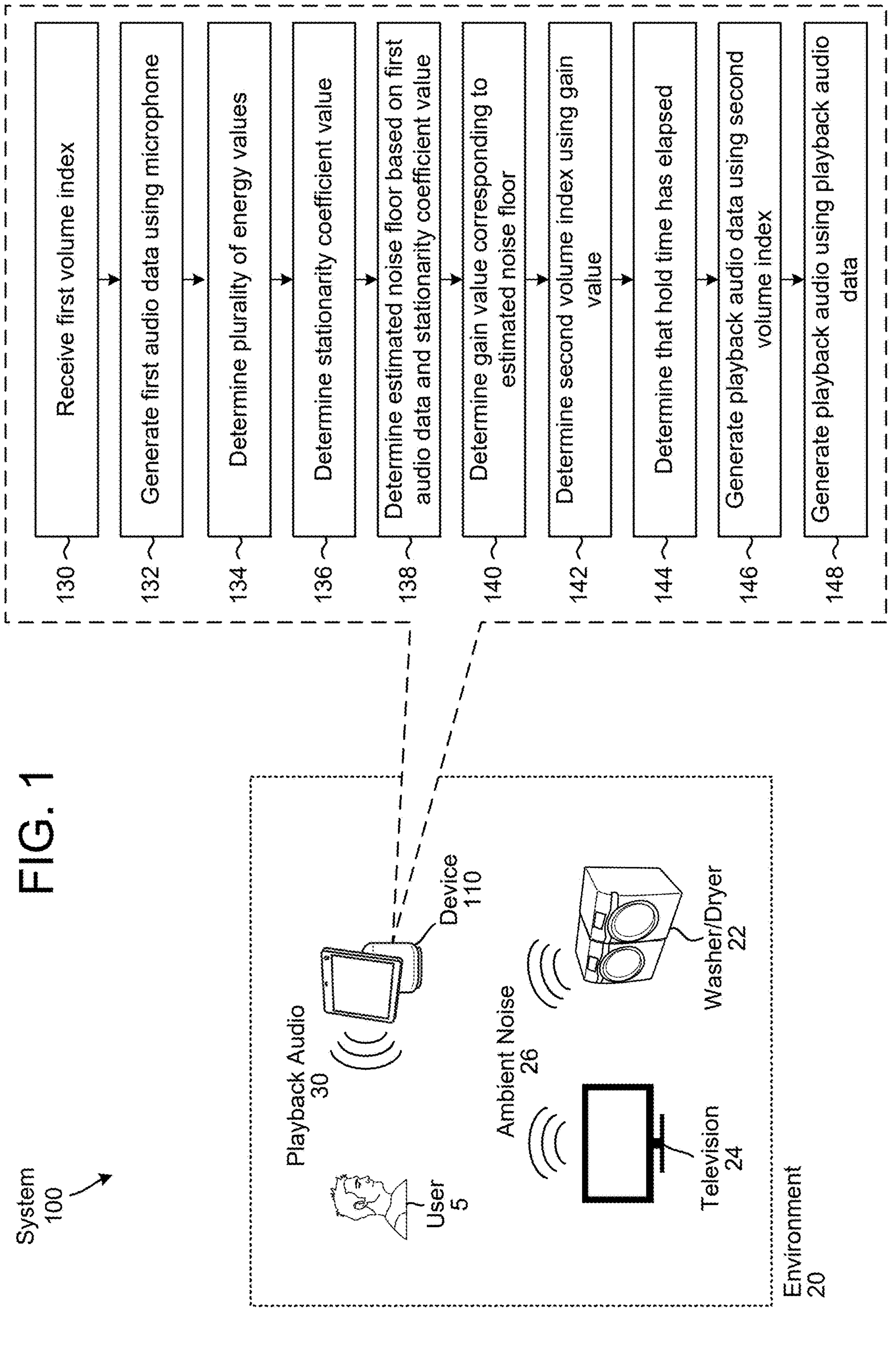
FIG. 1 illustrates a system configured to perform noise dependent volume control using a stationarity coefficient according to embodiments of the present disclosure.

To improve noise estimation and/or a customer experience, devices, systems and methods are disclosed that perform noise dependent volume control using a stationarity coefficient to reduce a sensitivity to voice activity and other non-stationary sounds. For example, a device may adaptively increase a volume level of playback audio based on an amount of ambient noise present in a noisy environment, with an amount of noise compensation determined based on an estimated noise level. To avoid overestimating the noise level during periods of voice activity (e.g., speech), loud transient sounds (e.g., slamming doors, coughing), and/or residual acoustic echo, the device may adaptively slow a noise tracking speed for non-stationary signals. For example, the device may extract features (e.g., short-term dynamic range and mean relative deviation of power spectrum centroid) that distinguish between stationary signals and non-stationary signals and calculate a stationarity coefficient to adaptively control noise estimation. Thus, the device may use a normal noise tracking speed for stationary signals and a slower noise tracking speed for non-stationary signals FIG. 1 illustrates a high-level conceptual block diagram of a system 100 configured to perform noise dependent volume control using a stationarity coefficient according to embodiments of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110, which may be communicatively coupled to network(s) 199, although the disclosure is not limited thereto.

The device 110 may be an electronic device configured to capture and/or receive audio data. For example, the device 110 may include a microphone array configured to generate audio data, although the disclosure is not limited thereto and the device 110 may include multiple microphones 112 without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive playback audio data and generate playback audio (e.g., output audio) using one or more loudspeakers 114 of the device 110. For example, the device 110 may generate playback audio corresponding to media content, such as music, a movie, and/or the like.

In some examples, a user 5 of the device 110 may establish a communication session with another device, where digitized speech signals are compressed, packetized, and transmitted via the network(s) 199. One technique for establishing the communication session involves Voice over Internet Protocol (VoIP), although the disclosure is not limited thereto and the device 110 may use other techniques without departing from the disclosure. During a communication session, the device 110 may receive far-end reference signal(s) (e.g., playback audio data) from a remote device/remote server(s) via the network(s) 199 and may generate playback audio (e.g., output audio) based on the far-end reference signal(s) using the one or more loudspeaker(s).

Using one or more microphone(s) 112 associated with the device 110, the device 110 may capture input audio as microphone signals (e.g., near-end reference audio data, input audio data, microphone audio data, etc.), may perform audio processing to the microphone signals to generate an output signal (e.g., output audio data), and may send the output signal to the remote device/remote server(s) via the network(s) 199. For example, the device 110 may send the output signal to the remote device either directly or via remote server(s) and may receive the far-end reference signal(s) from the remote device either directly or via the remote server(s).

As illustrated in FIG. 1, an environment 20 of the device 110 may include the user 5 and one or more noise sources, although the disclosure is not limited thereto. For example, FIG. 1 illustrates that the environment 20 may include the user 5, the device 110, and two noise sources; a washer/dryer 22 (e.g., first noise source) and a television 24 (e.g., second noise source). At various times, one or both of the noise sources may generate audible noises that may be represented in the input audio data generated by the device 110.

As part of outputting media content and/or the communication session, the device 110 may generate playback audio 30 for the user 5. In a quiet environment, the user 5 may perceive the playback audio 30 without interference or competition from other sound sources in proximity to the device 110. However, the noise sources may create ambient noise 26 that distracts from the playback audio 30 and/or impacts the user's ability to perceive the playback audio 30. For example, the noisy environment may decrease intelligibility of speech, clarity/fidelity of music or other content, and/or the like.

To improve a customer experience listening to the playback audio 30, the device 110 may perform noise dependent volume control in order to increase a volume level of the playback audio 30 in a noisy environment. For example, the device 110 may adaptively increase gain based on an amount of the ambient noise 26 present in the environment 20. The device 110 may determine a noise reference value and an estimated noise floor and determine the amount of gain based on a difference between the two. However, the device 110 may not automatically increase the volume level based on the difference; the device 110 may employ volume control logic to ensure that the volume level only increases when necessary and/or to control a rate at which the volume level increases. As part of selecting the volume level with which to generate the playback audio, the device 110 may use a lookup table to convert between a device volume and a quantized volume used to perform noise dependent volume control.

However, in some examples an estimate of the ambient noise may suffer from overestimation during periods of voice activity, loud transient sounds, and/or when residual acoustic echo is present during music playback. Overestimating the ambient noise may negatively impact a customer experience, as it may cause undesired fluctuations in playback volume or even volume runaway caused by a feedback loop. For example, the volume level may increase drastically during normal conversation and/or in response to temporary disturbances.

To improve a customer experience and prevent this overestimation, the device 110 may determine an estimated noise floor using a stationarity coefficient, as will be described in greater detail below with regard to FIGS. 8-10. For example, to avoid overestimating the noise floor during periods of voice activity (e.g., speech), loud transient sounds (e.g., slamming doors, coughing), and/or residual acoustic echo, the device 110 can adaptively slow a noise tracking speed for non-stationary signals. For example, the device 110 may extract features (e.g., short-term dynamic range and mean relative deviation of power spectrum centroid) that distinguish between stationary signals and non-stationary signals and calculate a stationarity coefficient to adaptively control the noise estimation. In some examples, the device 110 may use a normal noise tracking speed for stationary signals and a slower noise tracking speed for non-stationary signals, although the disclosure is not limited thereto.

As illustrated in FIG. 1, the device 110 may receive (130) a first volume index associated with playback audio, may generate (132) first audio data using the microphone(s), and may determine (134) a plurality of energy values corresponding to noise in the environment 20. For example, the device 110 may perform echo cancellation using the first audio data to generate isolated audio data and then may determine the plurality of energy values using particular frequency range(s) of interest within the isolated audio data.

Using the plurality of energy values and/or the first audio data, the device 110 may determine (136) a stationarity coefficient value, as will be described in greater detail below with regard to FIGS. 8-10. For example, the device 110 may extract features (e.g., short-term dynamic range and mean relative deviation of power spectrum centroid) that distinguish between stationary and non-stationary signals and may use these features to determine the stationarity coefficient value, which the device 110 may use to adaptively control the noise estimation.

The device 110 may determine (138) an estimated noise floor based on the first audio data and the stationarity coefficient value, as described in greater detail below with regard to FIG. 9. In some examples, the device 110 may include leaky integrator(s) configured to determine the estimated noise floor using the plurality of energy values. For example, a leaky integrator may be configured to apply a slow attack time constant and a fast release time constant in order to track an estimated noise floor value that represents a lower energy portion of the plurality of energy values. Additionally or alternatively, the leaky integrator may use a normal noise tracking speed for stationary signals (e.g., when the stationarity coefficient value exceeds a threshold value) and a slower noise tracking speed for non-stationary signals (e.g., when the stationarity coefficient value is below the threshold value), although the disclosure is not limited thereto.

The device 110 may determine (140) a gain value corresponding to the estimated noise floor. For example, the device 110 may determine a noise reference value and may determine the gain value based on a difference between the estimated noise floor value and the noise reference value, as described in greater detail below with regard to FIG. 6. After determining the gain value, the device 110 may determine (142) a second volume index using the gain value. In some examples, the device 110 may determine the second volume index (e.g., target volume index) by adding the gain value to the first volume index. However, the disclosure is not limited thereto, and the device 110 may determine that a sum of the first volume index and the gain value exceeds a maximum volume level and set the second volume index equal to the maximum volume level without departing from the disclosure. Additionally or alternatively, the device 110 may control a rate at which the volume level changes and/or only perform volume adaptation if a minimum gain threshold value is exceeded.

After determining the second volume index, the device 110 may determine (144) that a hold time has elapsed. In some examples, the device 110 may perform volume control processing, as described in greater detail below with regard to FIG. 4, to control a frequency at which the volume level changes. For example, the hold time may correspond to a first duration of time if the second volume index changes the volume level in the same direction as a previous volume level change, and the device 110 may only perform volume adaptation if the first duration of time has elapsed since the previous volume level change. Additionally or alternatively, the hold time may correspond to a second duration of time if the second volume index changes the volume in an opposite direction as the previous volume level change, and the device 110 may only perform volume adaptation if the second duration of time has elapsed since the previous volume level change. Thus, the device 110 may prevent any volume changes for the first duration of time and may prevent the volume change from reversing for the second duration of time, although the disclosure is not limited thereto.

If the device 110 determines that the hold time has elapsed, the device 110 may generate (146) playback audio data using the second volume index and may generate (148) playback audio using the playback audio data. For example, the device 110 may receive second audio data to output and the device 110 may generate the playback audio data by applying the second volume index to the second audio data, although the disclosure is not limited thereto. Thus, the second volume index may correspond to an updated volume setting of the device 110 and the device 110 may use the updated volume setting to generate the playback audio in order to compensate for the ambient noise present in the environment 20.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Figure 2A:
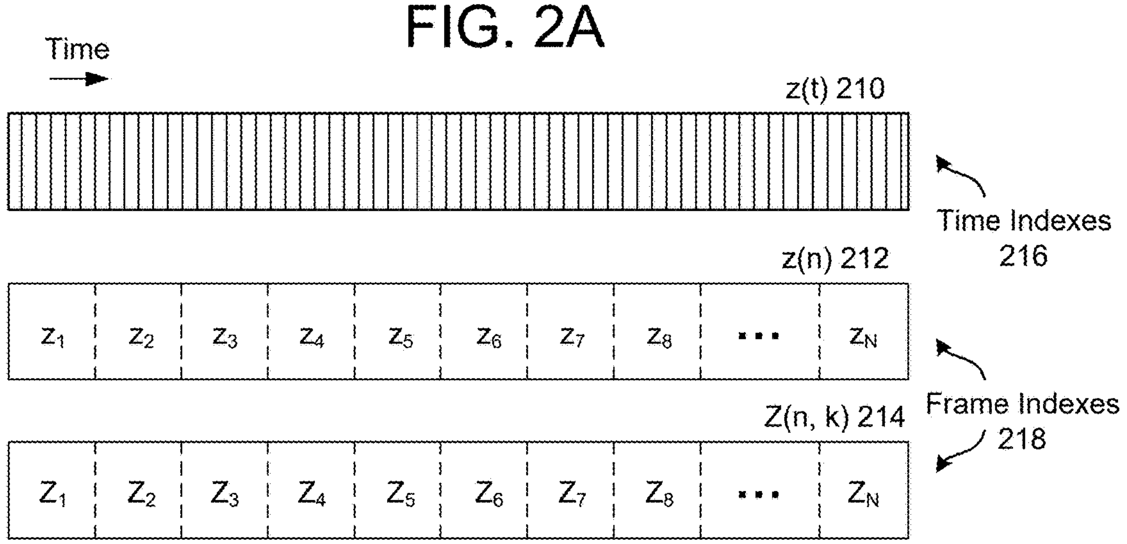
FIGS. 2A-2D illustrate examples of frame indexes, tone indexes, and channel indexes.

FIGS. 2A-2D illustrate examples of frame indexes, tone indexes, and channel indexes. As described above, the device 110 may generate microphone audio data z(t) using microphone(s). For example, a first microphone may generate first microphone audio data z1(*t*) in the time-domain, a second microphone may generate second microphone audio data z2(*t*) in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency-domain. As used herein, a variable Z(n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z(n, k) 216 in the frequency-domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
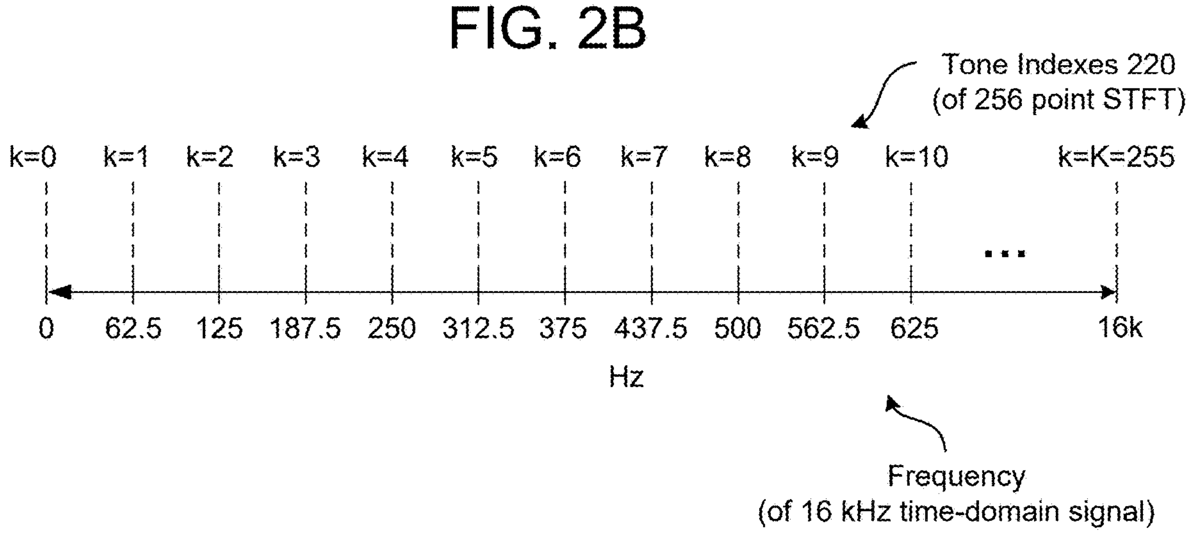

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
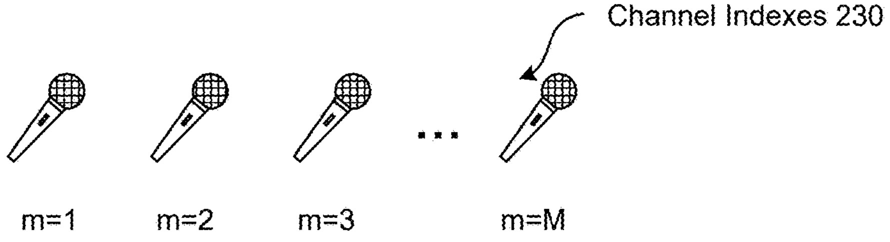

The system 100 may include multiple microphones, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M>1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data z1(*n*) associated with a first microphone to no longer be synchronized with second microphone audio data z2(*n*) associated with a second microphone. Thus, the device 110 may instead modify only the playback audio data x(n) so that the playback audio data x(n) is synchronized with the first microphone audio data z1(*n*).

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
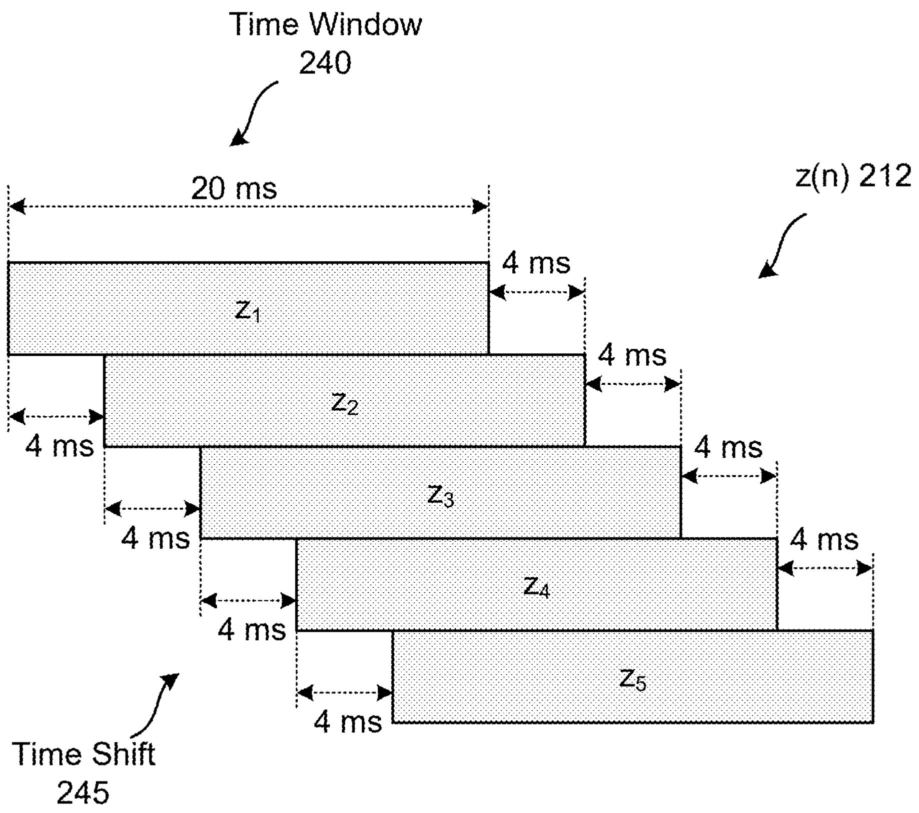

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

Figure 3:
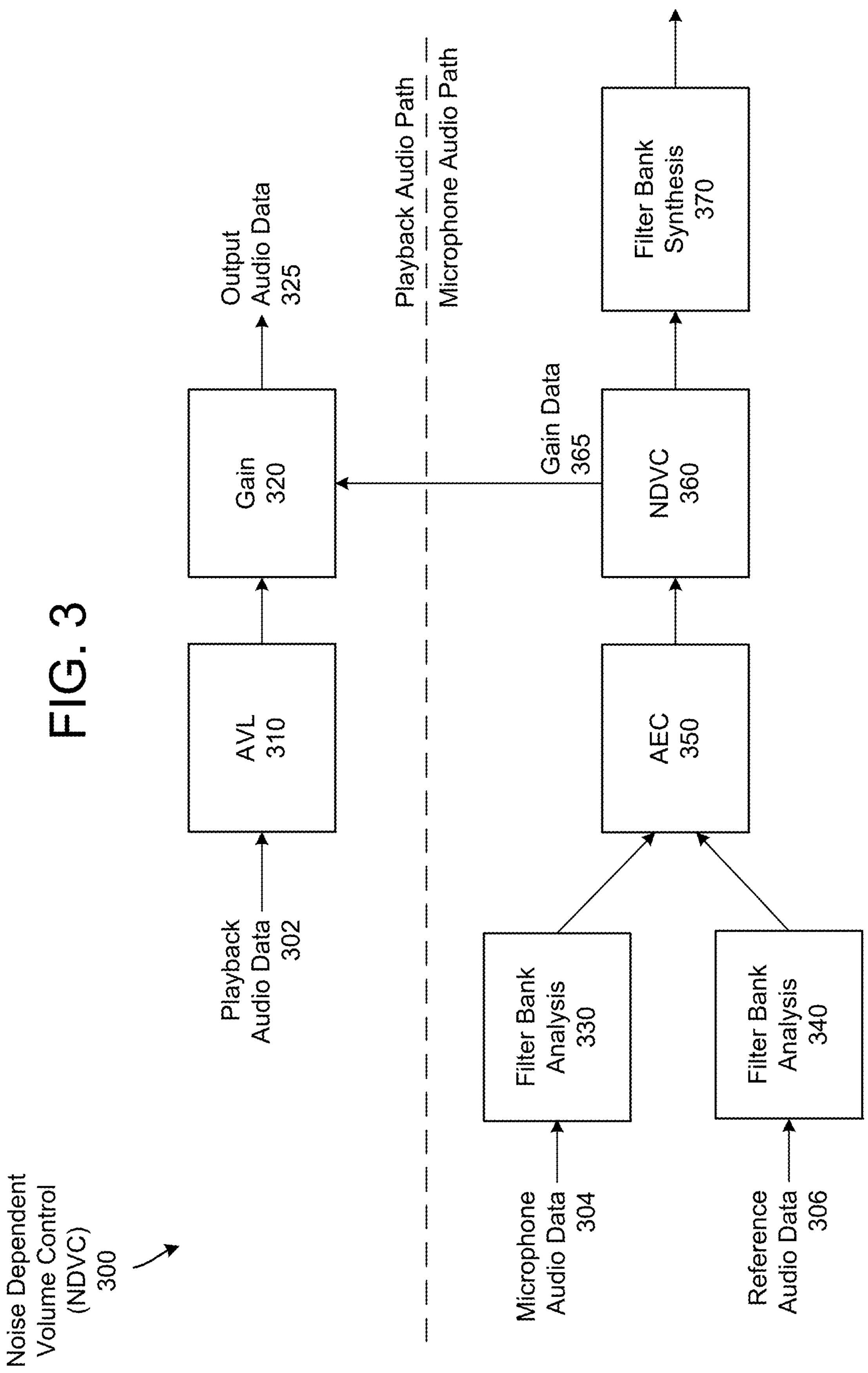
FIG. 3 illustrates an example component diagram for performing noise dependent volume control using a stationarity coefficient according to embodiments of the present disclosure.

FIG. 3 illustrates an example component diagram for performing noise dependent volume control using a stationarity coefficient according to embodiments of the present disclosure. As illustrated in FIG. 3, noise dependent volume control (NDVC) 300 may process playback audio data 302 to generate output audio data 325. For example, an automatic volume leveling (AVL) component may receive the playback audio data 302 and perform AVL processing to generate leveled audio data, while a gain component 320 may apply a plurality of gain values (e.g., gain data 365) to the leveled audio data to generate the output audio data 325.

As illustrated in FIG. 3, the AVL component 310 and the gain component 320 are included as part of a playback audio path that generates playback audio (e.g., output audio) using one or more loudspeaker(s) associated with the device 110. In some examples, the device 110 may receive first audio data from a remote device and/or remote system (not illustrated) while (i) playing media content (e.g., music, audio clip, video clip, television show, movie, and/or the like), (ii) participating in a communication session, (iii) processing a voice command, and/or the like, although the disclosure is not limited thereto. After receiving the first audio data, the device 110 may use one or more components (not illustrated) to process the first audio data and generate the playback audio data 302. For example, the device 110 may perform dynamic range compression, upward compression (e.g., expansion), downward compression, audio filtering or smoothing, volume control (e.g., embedded volume control), equalization (e.g., apply different gain values to different frequency bands), multi-band compression/limiting (e.g., maximize loudness and bass, prevent loudspeaker audio from overflow and clipping, and/or reduce total harmonic distortion that is unique to one or more loudspeaker(s) associated with the device 110), and/or additional processing without departing from the disclosure.

The AVL component 310 may process the playback audio data 302 to perform AVL processing and generate the leveled audio data. As used herein, AVL processing and/or automatic volume control and leveling (AVCL) correspond to controlling an output energy level for varying input energy levels. For example, the device 110 may measure an average amplitude of the input energy levels associated with a first time range of the input audio data and may dynamically adjust the input-to-output gain to a suitable value to generate output audio data at a desired output energy level (e.g., desired output average amplitude). The average amplitude can be a simple measurement of average power, such as a root mean square (RMS) value that is defined as a square root of mean square (e.g., arithmetic mean of squares of a set of numbers), which may also be referred to as a quadratic mean. Thus, AVL may be correspond to loudness normalization, variable-gain amplification, automatic gain control (AGC), and/or automatic volume control (AVC) without departing from the disclosure. Performing AVL processing results in dynamic range compression, as AVL processing reduces the volume of loud sounds and amplifies quiet sounds, thus reducing or compressing the dynamic range of the output audio data relative to the input audio data.

As will be described in greater detail below, the gain component 320 may then process the leveled audio data using the gain data 365 to generate the output audio data 325. In some examples, the device 110 may send the output audio data 325 to the one or more loudspeaker(s) to generate the playback audio. However, the disclosure is not limited thereto, and in other examples the device 110 may perform additional processing (e.g., volume control, equalization, multi-band compression/limiting, and/or the like) prior to generating the playback audio.

While the playback audio path processes playback audio data and generates the playback audio that is output to the user 5, a microphone audio path generates and processes microphone audio data representing acoustic noises detected by the device 110. For example, the device 110 may capture input audio by generating microphone audio data 304 using one or more microphones. In some examples, the device 110 may process the microphone audio data 304 to generate second audio data and may send the second audio data to the remote device and/or remote system via the network(s) 199. However, the disclosure is not limited thereto, and in other examples the device 110 may process the microphone audio data 304 locally without departing from the disclosure.

As illustrated in FIG. 3, a noise dependent volume control (NDVC) component 360 may be included within the microphone audio path and may generate the plurality of gain values (e.g., gain data 365) based on the microphone audio data 304. In some examples, the NDVC component 360 may estimate a noise floor associated with ambient noise in the environment 20, as will be described in greater detail below with regard to FIGS. 8-10, and may determine the gain data 365 to compensate for the estimated noise floor. For example, a quiet environment may correspond to a low estimated noise floor and therefore lower gain values, whereas a loud environment may correspond to a high estimated noise floor and therefore higher gain values.

In the example illustrated in FIG. 3, the NDVC component 360 generates the gain data 365 using an output of an acoustic echo cancellation (AEC) component 350. In some examples, the AEC component 350 may receive microphone audio data and reference audio data and perform echo cancellation to generate isolated audio data. For example, the AEC component 350 may generate an estimated echo signal using the reference audio data and then subtract the estimated echo signal from the microphone audio data to generate the isolated audio data. Thus, the isolated audio data represents speech, acoustic noise, and other ambient sounds present in the environment, but a representation of an echo signal corresponding to the playback audio generated by the loudspeaker(s) is attenuated. Using the isolated audio data, the NDVC component 360 may generate the plurality of gain values (e.g., gain data 365) based on the ambient noise that may interfere with the user's ability to perceive the playback audio.

In the example illustrated in FIG. 3, the AEC component 350 performs echo cancellation in a frequency domain. For example, a first filter bank analysis component 330 may receive microphone audio data 304 in a time domain and may convert from the time domain to the frequency domain. In some examples, the first filter bank analysis component 330 may generate audio data having a plurality of subbands (e.g., frequency ranges) associated with each channel (e.g., individual microphone) of the microphone audio data 304. Similarly, a second filter bank analysis component 340 may receive reference audio data 306 in the time domain and may convert from the time domain to the frequency domain. Thus, the second filter bank analysis component 340 may generate audio data having a plurality of subbands (e.g., frequency ranges) associated with each individual channel of the reference audio data 306. However, the disclosure is not limited thereto and in some examples the AEC component 350 may perform echo cancellation in the time domain without departing from the disclosure.

In some examples, the reference audio data 306 may correspond to the playback audio generated by the playback audio path. For example, the reference audio data 306 may correspond to a delayed version of the output audio data 325 without departing from the disclosure. Thus, the AEC component 350 may perform echo cancellation using the output audio data 325 that was used to generate the playback audio. However, the disclosure is not limited thereto and in other examples the reference audio data 306 may correspond to a microphone signal without departing from the disclosure. For example, the reference audio data 306 may correspond to audio data generated by reference microphone(s), a portion of the microphone audio data 304, and/or the like, although the disclosure is not limited thereto.

In some examples, the playback audio data 302 and the output audio data 325 have a first sampling rate (e.g., 48 kHz), while the microphone audio data 304 has a second sampling rate (e.g., 16 kHz). In order to perform echo cancellation using the microphone audio data 304, in some examples the device 110 may generate the reference audio data 306 such that it has the second sampling rate. For example, the device 110 may delay the output audio data 325 and perform downsampling to generate the reference audio data 306, although the disclosure is not limited thereto.

After processing the isolated audio data to generate the gain data 365, the NDVC component 360 may output the isolated audio data to a filter bank synthesis component 370. The filter bank synthesis component 370 may be configured to process the isolated audio data in the frequency domain and generate second audio data in the time domain. The device 110 may perform additional processing to the second audio data and/or send the second audio data to a remote device and/or remote system without departing from the disclosure.

Figure 4:
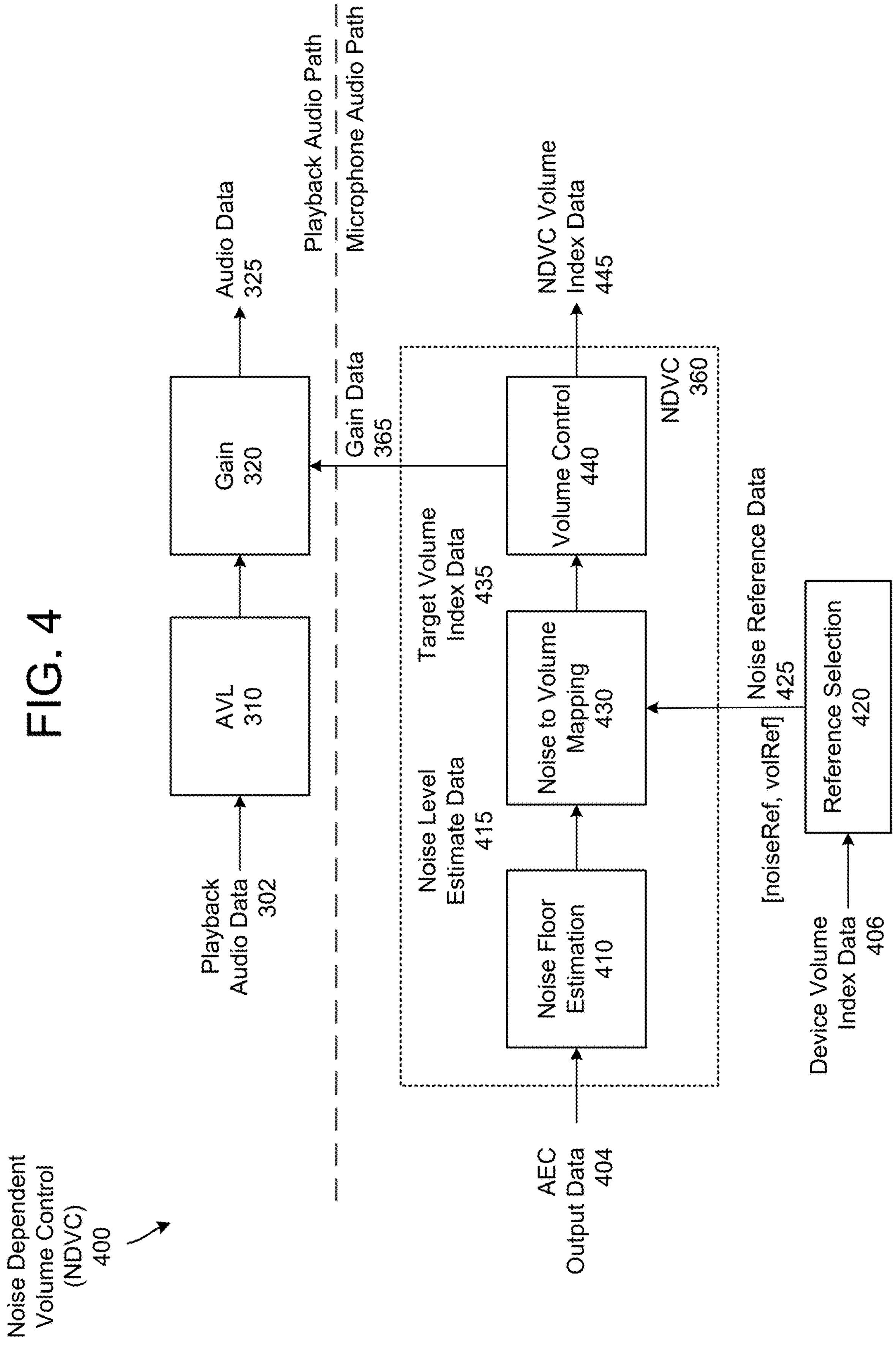
FIG. 4 illustrates an example component diagram for performing noise dependent volume control using a stationarity coefficient according to embodiments of the present disclosure.

FIG. 4 illustrates an example component diagram for performing noise dependent volume control using a stationarity coefficient according to embodiments of the present disclosure. While the playback audio path illustrated in FIG. 4 is identical to the one described above with regard to FIG. 3, FIG. 4 illustrates a detailed example of the NDVC component 360 generating the gain data 365. For example, the device 110 may perform noise dependent volume control (NDVC) 400 using a noise floor estimation component 410, a noise to volume mapping component 430, and a volume control component 440.

As illustrated in FIG. 4, the noise floor estimation component 410 may receive AEC output data 404 from the AEC component 350 and may generate noise level estimate data 415 that tracks an estimated noise floor. In some examples, the noise floor estimation component 410 may calculate a frame energy value for an individual audio frame of the AEC output data 404 and use the frame energy value to update the estimated noise floor value. For example, the noise floor estimation component 410 may apply a leaky integrator to smooth an average of the frame energy values over time and ignore transient noises (e.g., a door slamming, coughing, clapping, etc.). Thus, the estimated noise floor value tracks continuous sounds that increase ambient noise and may interfere with the user's perception of the playback audio. In some examples, the noise floor estimation component 410 may determine the frame energy value using a specific frequency range (e.g., desired frequency bands, such as 400 Hz to 8 kHz) of the AEC output data 404, such that the estimated noise floor value corresponds to energy represented in this frequency range. As used herein, the estimated noise floor value may refer to an estimated noise floor value, an estimated noise floor level, an estimated noise value, an estimated noise level, and/or the like without departing from the disclosure.

To determine the estimated noise floor, the noise floor estimation component 410 may apply different time constants for different conditions based on a current frame energy value. To illustrate an example, the noise floor estimation component 410 may apply a slow time constant for attack conditions (e.g., 4 second attack time), which occur when a current frame energy value exceeds the estimated noise floor value. In contrast, the noise floor estimation component 410 may apply a fast time constant for release conditions (e.g., 0.1 second release time), which occur when the current frame energy value is below the estimated noise floor value. Selecting the attack time to be significantly longer than the release time may reduce the impact of transient sounds (e.g., ignore transient noises, such as a door slamming, coughing, clapping, etc.) while accurately tracking the long-term noise floor. However, in order to be responsive to continuous noises, the noise floor estimation component 410 may shorten the attack time adaptively if the attack conditions persist. For example, the noise floor estimation component 410 may apply a first attack time (e.g., 4 seconds) for a first duration of time (e.g., 2 seconds), but if the attack conditions persist for longer than the first duration of time, the noise floor estimation component 410 may shorten the attack constant and track the noise floor more quickly. In some examples, the noise floor estimation component 410 may instantly increase to a second attack time (e.g., 2 seconds) after the first duration of time. However, the disclosure is not limited thereto, and in other examples the noise floor estimation component 410 may transition from the first attack time to the second attack time over a plurality of audio frames without departing from the disclosure.

In order to accurately track the estimated noise floor, in some examples the noise floor estimation component 410 may ignore speech activity. For example, the device 110 may include a voice activity detection (VAD) component configured to detect speech and identify whether speech is represented in the AEC output data 404. If the VAD component determines that speech is detected in a particular audio frame, the noise floor estimation component 410 may freeze the estimated noise floor value by ignoring the frame energy value associated with the audio frame. Thus, the noise floor estimation component 410 may only update the estimated noise floor value when speech activity is not detected without departing from the disclosure. However, the disclosure is not limited thereto, and in other examples the noise floor estimation component 410 may continue to update the estimated noise floor value even if speech activity is detected without departing from the disclosure.

In some examples, the device 110 may distinguish between speech activity associated with a user (e.g., human generated speech, such as an utterance from the user 5) and speech activity corresponding to a loudspeaker (e.g., machine generated speech, such as dialog output by a television). Thus, the noise floor estimation component 410 may selectively freeze the estimated noise floor value when human generated speech is detected, but may continue to update the estimated noise floor value based on machine generated speech (e.g., consider dialog output by the television to be a noise signal).

Additionally or alternatively, the noise floor estimation component 410 may determine the estimated noise floor using a stationarity coefficient, as will be described in greater detail below with regard to FIGS. 8-10. For example, to avoid overestimating the noise floor during periods of voice activity (e.g., speech), loud transient sounds (e.g., slamming doors, coughing), and/or residual acoustic echo, the noise floor estimation component 410 can adaptively slow a noise tracking speed for non-stationary signals. For example, the noise floor estimation component 410 may extract features (e.g., short-term dynamic range and mean relative deviation of power spectrum centroid) that distinguish between stationary signals and non-stationary signals and calculate a stationarity coefficient to adaptively control the noise estimation. In some examples, the noise floor estimation component 410 may use a normal noise tracking speed for stationary signals and a slower noise tracking speed for non-stationary signals, although the disclosure is not limited thereto.

In some examples, the noise floor estimation component 410 may determine a single estimated noise floor value for each audio frame, and the noise level estimate data 415 may comprise a single estimated noise floor value or a plurality of estimated noise floor values without departing from the disclosure. For example, if the playback audio data 302 has the first sampling rate (e.g., 48 kHz), the AEC output data 404 has the second sampling rate (e.g., 16 kHz), and an audio frame has a first duration (e.g., 8 ms), an individual audio frame may correspond to 384 samples of the playback audio data 302, 128 samples of the AEC output data 404, and a single estimated noise floor value. The noise floor estimation component 410 may output the noise level estimate data 415 to the noise to volume mapping component 430 as individual estimated noise floor values without departing from the disclosure.

As illustrated in FIG. 4, a reference selection component 420 may receive device volume index data 406 and may generate noise reference data 425. In some examples, the reference selection component 420 may generate noise reference data 425 that indicates a noise reference value and a volume reference value (e.g., [noiseRef, volRef]). For example, the reference selection component 420 may calculate the noise reference value and the volume reference value in decibels (dB), although the disclosure is not limited thereto.

The reference selection component 420 may determine the volume reference value based on the device volume index data 406. For example, the device volume index data 406 may indicate a first volume index value (e.g., current volume index) that the device 110 is using to generate the playback audio. However, the first volume index value may represent a playback volume using a different convention than what is used by the volume mapping component 430. For example, the first volume index value may indicate a percentage value (e.g., 0-100%) or an integer value (e.g., 0-100), although the disclosure is not limited thereto. In contrast, the volume mapping component 430 may indicate a decibel (dB) value, although the disclosure is not limited thereto.

The reference selection component 420 may also determine a noise reference value (noiseRef). For example, the device 110 may determine the noise reference value differently depending on a current mode of operation (e.g., configuration settings, user preferences, and/or the like), although the disclosure is not limited thereto. In some examples, the device 110 may determine the noise reference value using three different modes of operation, with each mode selecting a different noise level as the noise reference value for volume adaptation. For example, a first mode may determine the noise reference value based on a noise level at the time that the user most recently changed a volume level of the device 110, a second mode may determine the noise reference value based on an initial noise level for a current session, and a third mode may determine the noise reference value based on a fixed noise level (e.g., calibration noise level) determined for the device 110.

To illustrate an example, the first mode may correspond to a volume adjustment reference that determines the noise reference value based on a noise level at the time that the user most recently changed a volume level of the device 110. In some examples, in response to receiving a command to change the current volume index, the reference selection component 420 may determine a current estimated noise floor value and set the current estimated noise floor value as the noise reference value. For example, the reference selection component 420 may detect changes in the current volume index based on the device volume index data 406. When a change in the current volume index is detected, the reference selection component 420 may determine the current estimated noise floor value using the noise level estimate data 415 and store the current estimated noise floor value as the noise reference value. Thus, the reference selection component 420 may generate noise reference data 425 indicating this noise reference value until a subsequent request to change the volume level.

In contrast, the second mode may correspond to a session initialization reference that determines the noise reference value based on an initial noise level for a current session. For example, during an initialization stage of a current session, the reference selection component 420 may determine a first estimated noise floor value using the noise level estimate data 415 and may set the first estimated noise floor value as the noise reference value. Thus, the reference selection component 420 may generate noise reference data 425 indicating this noise reference value for the duration of the current session.

As used herein, a current session corresponds to a period of time during which the device 110 is consistently and/or continuously generating playback audio. For example, the user may input a first command instructing the device 110 to generate playback audio, beginning a first session. The device 110 may continue generating playback audio associated with the first command and/or subsequent commands until either (i) the device 110 finishes outputting requested media content without receiving a subsequent command for a duration of time or (ii) the user inputs a second command instructing the device 110 to stop generating the playback audio. When either of these conditions occur, the first session ends and the reference selection component 420 may stop using the first estimated noise floor value as the noise reference value. For example, if the device 110 later receives a third command to generate playback audio, the third command begins a second session and the reference selection component 420 may determine a second estimated noise floor value and set the second estimated noise floor value as the noise reference value for the duration of the second session.

Finally, the third mode may correspond to a fixed reference that determines the noise reference value based on a fixed noise level (e.g., calibration noise level) determined for the device 110. For example, as part of manufacturing, testing, calibration, and/or the like, the device 110 may generate calibration data and determine a noise reference floor value that indicates a nominal quiet level associated with the microphones of the device 110 in a quiet environment. Thus, the reference selection component 420 may set the noise reference floor value as the noise reference value and may generate noise reference data 425 indicating the noise reference floor value every time the device 110 generates the playback audio.

While the example described above refers to three different modes of operation, the disclosure is not limited thereto and the device 110 may determine the noise reference value using any number of modes of operations without departing from the disclosure. For example, the device 110 may determine the noise reference value using a mode of operation not described above without departing from the disclosure. Additionally or alternatively, the device 110 may be configured to determine the noise reference value using a single mode of operation without departing from the disclosure. Regardless of how the device 110 determines the noise reference value (e.g., reference noise value), the reference selection component 420 may generate the noise reference data 425 that includes the noise reference value and the volume reference value and may output the noise reference data 425 to the noise to volume mapping component 430.

As illustrated in FIG. 4, the noise to volume mapping component 430 may receive the noise level estimate data 415 from the noise floor estimation component 410 and the noise reference data 425 from the reference selection component 420. Based on these inputs, the noise to volume mapping component 430 may determine a desired volume index and generate target volume index data 435. For example, the noise to volume mapping component 430 may determine a noise-to-volume function to estimate a noise compensation value, may use the noise compensation value to determine a gain value to apply to compensate for the noise, and may use the gain value and a first volume index value (e.g., current volume index) to determine a second volume index value (e.g., desired volume index), although the disclosure is not limited thereto.

In some examples, the noise to volume mapping component 430 may simulate volume changes using quantized values. For example, while the device 110 may calculate the gain value and/or the second volume index value using continuous values represented in decibels (dB), the device 110 may further stabilize volume jitter and oscillations by quantizing these continuous gain values using a quantized lookup table. To illustrate an example, the device 110 may only increase from the first volume index value to the second volume index value if the gain value is sufficiently large to justify this transition. Thus, the device 110 may ignore smaller gain values as not being sufficient to jump to the next quantized value in the quantized lookup table, further stabilizing the output volume and preventing undesirable fluctuations that may occur if the continuous values are used to select the second volume index value.

FIG. 5 illustrates an example of a quantized volume table according to embodiments of the present disclosure. As illustrated in FIG. 5, a volume table 500 may include a first number of volume indexes (e.g., 0-30), with each volume index indicating a corresponding quantized value represented in decibels. For example, a first volume index (e.g., 0) corresponds to a first value (e.g., 0 dB), a second volume index (e.g., 1) corresponds to a second value (e.g., −2 dB), a third volume index (e.g., 2) corresponds to a third value (−4 dB), and so on until a $29^{th}$ volume index (e.g., 28) corresponds to a $29^{th}$ value (e.g., −66 dB), a $30^{th}$ volume index corresponds to a $30^{th}$ value (e.g., −70 dB), and a $31^{st}$ volume index corresponds to a $31^{st}$ value (e.g., −200 dB). Thus, the volume table 500 includes a range of quantized volume values from 0 dB down to −200 dB. However, the disclosure is not limited thereto and the device 110 may vary a number of volume indexes, the values associated with each volume index, and/or the like without departing from the disclosure. Using the volume table 500, the device 110 may only increase from a current volume index to a target volume index if the gain value exceeds the difference between the current volume index and the target volume index.

Figure 6:
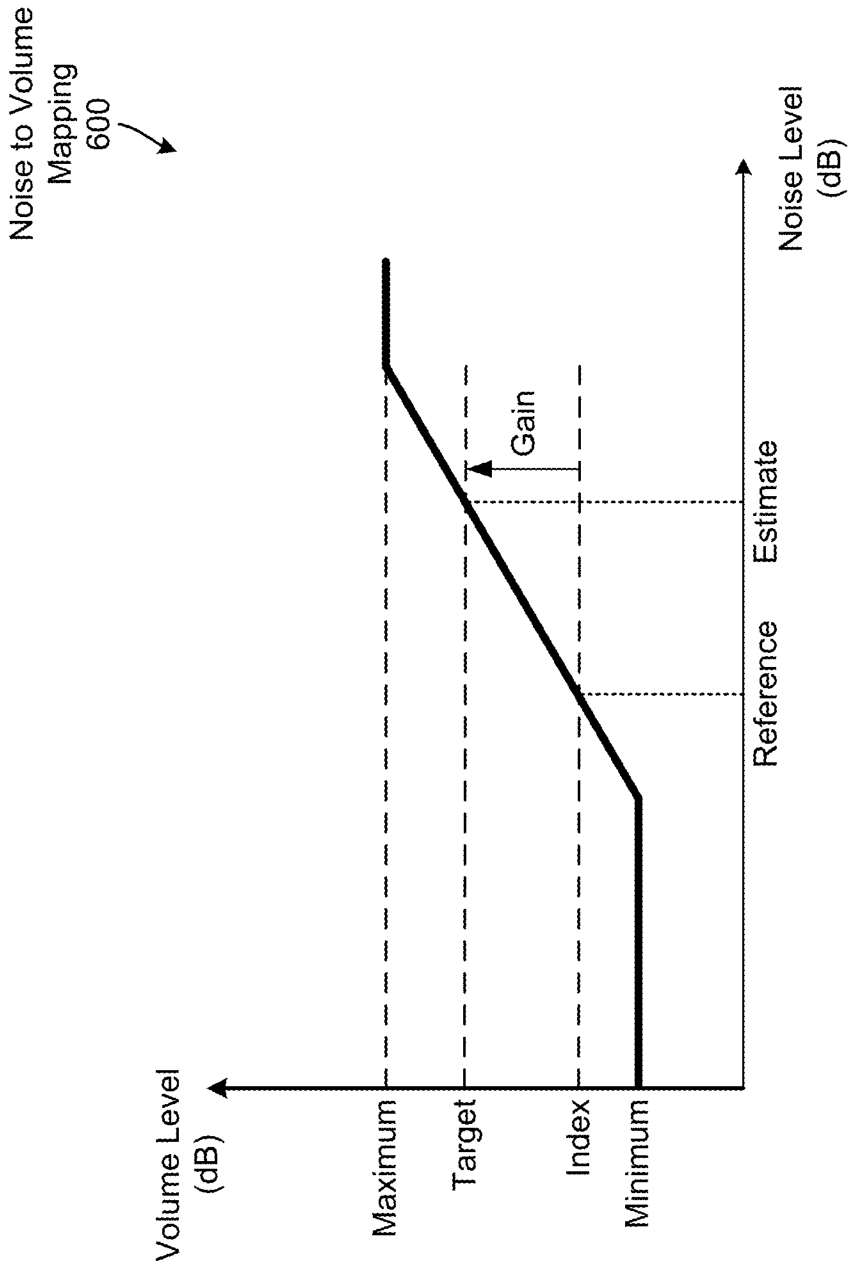
FIG. 6 illustrates an example of noise to volume mapping according to embodiments of the present disclosure.

FIG. 6 illustrates an example of noise to volume mapping according to embodiments of the present disclosure. As described above, the noise to volume mapping component 430 may determine a noise-to-volume function to estimate a noise compensation value. As illustrated in FIG. 6, noise to volume mapping 600 depicts a noise level (measured in dB) along a horizontal axis and a volume level (measured in dB) along a vertical axis, with the volume level restricted by a minimum volume level (e.g., Minimum) and a maximum volume level (e.g., Maximum). Thus, the volume level is never set below the minimum volume level and never exceeds the maximum volume level. Within this range, however, the volume level is represented by the noise-to-volume function, which is a line that passes through a reference point (e.g., [noiseRef, volumeRef]) and has a particular slope (e.g., coefficient value). As described above, the noise reference data 425 may set the reference point that defines the noise-to-volume mapping, although the disclosure is not limited thereto.

In the noise to volume mapping 600 example illustrated in FIG. 6, the reference point (e.g., [noiseRef, volumeRef]) is illustrated as a noise reference value (e.g., Reference) and a current volume index value (e.g., Index). The noise compensation value corresponds to an increase in the estimated noise floor value (e.g., Estimate) relative to the noise reference value. For example, the device 110 may determine the noise compensation value by determining a difference between the estimated noise floor value and the noise reference value (e.g., ΔN=Estimate−Reference).

Using the noise compensation value (e.g., ΔN) and the coefficient value (e.g., m), the device 110 may determine the gain value (e.g., Gain) that may be used to compensate for the noise (e.g., Gain=m(ΔN)). For example, the device 110 may determine the target volume index value (e.g., Target) by adding the gain value to the current volume index value (e.g., Target=Index+Gain). Thus, the device 110 may generate the playback audio using the target volume index value in order to compensate for the noise represented by the estimated noise floor value.

In some examples, the device 110 may set a maximum gain value to control a rate at which the playback volume increases or decreases. For example, the device 110 may limit an absolute value of the gain value to a first value (e.g., 8 dB), such that any positive or negative gain values are capped by the first value (e.g., set equal to +/−8 dB). Thus, if the playback volume increases by a gain value over 8 dB, the device 110 may set the gain value equal to +8 dB, whereas if the playback volume decreases by a gain value below −8 dB, the device 110 may set the gain value equal to −8 dB. However, the disclosure is not limited thereto and the device 110 may set the gain value equal to other values (e.g., +/−4 dB) without departing from the disclosure. Additionally or alternatively, the device 110 may set a minimum gain value and may ignore gain values below the minimum gain value. For example, the device 110 may ignore any gain values having an absolute value below a second value (e.g., 1 dB), such that gain values within a minimum range (e.g., −1 dB to 1 dB) are ignored and do not result in a change in volume.

Referring back to FIG. 4, the noise to volume mapping component 430 may generate the target volume index data 435 using the target volume index value determined by the noise to volume mapping 600. In some examples, the target volume index data 435 may include a single target volume index value for each audio frame, although the disclosure is not limited thereto. The noise to volume mapping component 430 may output the target volume index data 435 to the volume control component 440.

The volume control component 440 may process the target volume index data 435 to determine an NDVC volume index data 445 and corresponding gain data 365. In some examples, the volume control component 440 may determine whether the target volume index data 435 corresponds to a change in the playback volume and, if so, whether the requested volume change is executed by the device 110. For example, the volume control component 440 may control volume changes based on a set of constraints, which include a volume hold time, a hysteresis time, a minimum volume index, a maximum volume index, and/or the like.

In some examples, the volume hold time may indicate a first duration of time (e.g., 0.75 seconds) and the volume control component 440 may use the volume hold time to prevent frequent volume changes. For example, after each volume change, the volume control component 440 may prevent any subsequent volume changes for the first duration of time. Similarly, the volume control component 440 may use the hysteresis time to prevent the volume level from changing directions (e.g., reversing directions) for a second duration of time (e.g., 4 seconds). For example, after a first volume change to increase the volume level (e.g., positive volume change), the volume control component 440 may make a second volume change to increase the volume level after the first duration of time has elapsed, but may not make a second volume change to decrease the volume level until after the second duration of time has elapsed. Similarly, after a third volume change to decrease the volume level (e.g., negative volume change), the volume control component 440 may make a fourth volume change to decrease the volume level after the first duration of time has elapsed, but may not make a fourth volume change to increase the volume level until after the second duration of time has elapsed. Thus, the hold time reduces a total number of volume changes, whereas the hysteresis time reduces a frequency at which the volume changes direction.

In some examples, the device 110 may also use the minimum volume index and the maximum volume index to control volume adaptation. For example, the minimum volume index (e.g., −70 dB) may be used to prevent spurious volume changes based on speech activity or other intermittent noises in a quiet environment. Similarly, the maximum volume index may be used to prevent volume changes in a loud environment, even if the estimated noise floor varies over time.

While the noise to volume mapping component 430 includes constraints that modify a target volume index and/or a change in the amount of gain (e.g., limiting the change in the amount of gain to a maximum value, ignoring small changes in the amount of gain, etc.), the constraints used by the volume control component 440 control whether a requested volume change is accepted or not. For example, if the target volume index data 435 indicates a new target volume index but the volume control constraints are not satisfied (e.g., a sufficient amount of time has not elapsed since a previous volume change), the volume control component 440 may reject the requested volume change and maintain a current target volume index. Thus, the volume control component 440 may output NDVC volume index data 445 indicating the current target volume index (e.g., based on a previous estimated noise floor) and may output gain data 365 indicating an amount of gain to apply to increase from the current volume index indicated by the device volume index data 406 to the current target volume index indicated by the NDVC volume index data 445.

In contrast, if the target volume index data 435 indicates a new target volume index and all of the volume control constraints are satisfied, the volume control component 440 may accept the requested volume change and set a new target volume index. Thus, the volume control component 440 may output NDVC volume index data 445 indicating the new target volume index (e.g., based on a current estimated noise floor) and may output gain data 365 indicating an amount of gain to apply to increase from the current volume index indicated by the device volume index data 406 to the new target volume index indicated by the NDVC volume index data 445. In some examples, the volume control component 440 may output a volume change notification (e.g., indication of a change in the target volume index), which may be used to indicate the new target volume index to other volume-dependent processes, although the disclosure is not limited thereto.

In some examples, the device 110 may perform additional processing to reduce feedback and/or distortion caused by a positive feedback loop. For example, the device 110 may determine whether there is a correlation between gain values being applied and the estimated noise floor values being measured. If the device 110 determines that the gain values and the estimated noise floor values are increasing at the same time, the device 110 may prevent a potential feedback loop by not increasing the gain value (e.g., maintain a current gain value), freezing the current target volume (e.g., maintain a current volume index), and/or setting the gain value to a fixed value (e.g., 0 dB) for a duration of time.

Figure 7:
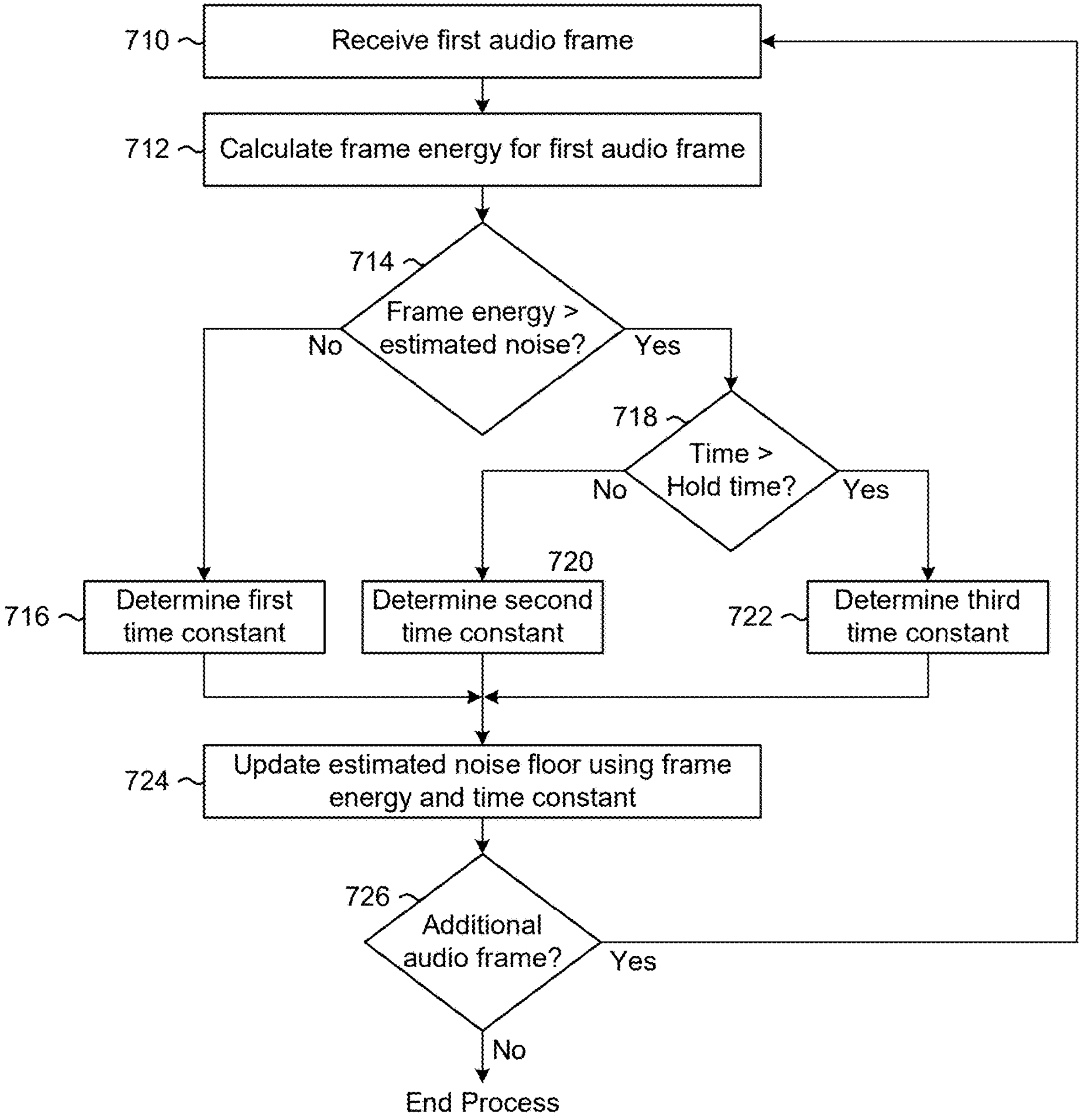
FIG. 7 is a flowchart conceptually illustrating an example method for determining an estimated noise floor value using multiple time constants according to examples of the present disclosure.

FIG. 7 is a flowchart conceptually illustrating an example method for determining an estimated noise floor value using multiple time constants according to examples of the present disclosure. As illustrated in FIG. 7, the device 110 may receive (710) a first audio frame and may calculate (712) a frame energy for the first audio frame. For example, the first audio frame may be an individual audio frame included in isolated audio data generated by the AEC component 350 and/or the frame energy may be calculated using desired frequency range(s) of the first audio frame, although the disclosure is not limited thereto.

The device 110 may determine (714) whether the frame energy is greater than an estimated noise floor value and, if not, may determine (716) a first time constant (e.g., release time constant). If the frame energy is greater than the estimated noise floor value, the device 110 may determine (718) whether an attack time exceeds a hold time and, if not, may determine (720) a second time constant (e.g., slow attack time constant). If the attack time exceeds the hold time, indicating that the frame energy values for successive audio frames have been greater than the estimated noise floor values for a first duration of time (e.g., 2 seconds, although the disclosure is not limited thereto), the device 110 may determine (722) a third time constant (e.g., fast attack time constant). Thus, the device 110 may initially apply a slow attack time constant to avoid increasing the estimated noise floor based on transient sounds and then may adaptively increase the attack time constant when the sound continues for a sufficient duration of time.

The device 110 may update (724) the estimated noise floor using the frame energy and the time constant determined above. For example, the device 110 may update the noise floor using the frame energy and applying the first time constant determined in step 716, the second time constant determined in step 720, or the third time constant determined in step 722, although the disclosure is not limited thereto. The device 110 may then determine (726) whether there is an additional audio frame, and if so, may loop to step 710 and perform steps 710-724 for the additional audio frame. If the device 110 determines that there is not an additional audio frame, the device 110 may end the process. While not illustrated in FIG. 7, after updating the estimated noise floor in step 724, the device 110 may use a current estimated noise floor value to determine the gain value, the target volume index, and/or the like as described in greater detail above.

In the example illustrated in FIG. 7, the estimated noise floor may be calculated using a leaky integrator with an adaptive attack time. For example, the estimated noise floor may be updated at each processing frame n, by smoothing a frame level over time:

$$\bar{N}(n) = \bar{N}(n-1) + \alpha_N\big(P(n) - \bar{N}(n-1)\big) \quad [1]$$

where $\bar{N}(n)$ indicates the estimated noise floor for a current audio frame (e.g., n), $\bar{N}(n-1)$ indicates the estimated noise floor for a previous audio frame (e.g., n−1), $\alpha_N$ indicates an adaptive smoothing coefficient, and P(n) indicates a power value of the current audio frame (e.g., mean square of the audio samples in frame n, measured in dB).

At each processing frame, the device 110 calculates the adaptive smoothing coefficient $\alpha_N$ using the steps illustrated in FIG. 7. As illustrated in FIG. 7, if the power value P(n) (e.g., frame energy) is greater than the estimated noise floor, the device 110 may select between the second time constant (e.g., attack coefficient) and the third time constant (e.g., short attack coefficient) based on a hold time. For example, each time the frame energy is greater than the estimated noise floor, the device 110 may increment a hold counter. During the hold period (e.g., hold counter is less than a threshold value, such as a first number of frames), the device 110 may select a longer attack time (e.g., second time constant) and increment the hold counter. When the hold period elapses (e.g., hold counter exceeds the threshold value), the device 110 may shorten the attack time (e.g., third time constant). However, if the frame energy is less than the estimated noise floor, the device 110 may select a short release time for minima tracking (e.g., first time constant) and reset the hold counter to zero. Thus, the first time constant may correspond to a release coefficient, such as a non-adaptive, short release time for minima tracking. By resetting the hold counter, the device 110 starts a new hold period for the next attack.

In this example, the leaky integrator may use a long attack and a short release time in order to perform minima tracking. Note that Equation [1] is calculated using dB values, which favors minima tracking due to the expansion of lower values inherent to the logarithm function. The leaky integrator does not strictly freeze during the hold time, but instead uses a long attack time (e.g., second time constant) for slow tracking. When the hold period elapses, the attack time is shortened to a value (e.g., third time constant) that is still larger than the release time (e.g., first time constant).

This strategy enables the leaky integrator to achieve a compromise between reducing sensitivity to short transients and tracking noise variations at reasonable speed. Using the time constant determined in steps 716, 720, or 722, the device 110 may calculate the adaptive smoothing coefficient $\alpha_N$:

$$\alpha_N = 1 - e^{-(N_F/(\tau_N \cdot f_s))} \quad [2]$$

where $N_F$ indicates a frame length (e.g., number of audio samples in a processing frame), $\tau_N$ indicates the time constant determined based on the current mode of operation (e.g., attack, hold, release), and $f_s$ indicates a sampling rate. For example, if an audio frame is 8 ms long and the sampling rate $f_s$ is 48 kHz, the frame length $N_F$ may correspond to 384 samples, although the disclosure is not limited thereto. In some examples, the first time constant may correspond to a first range of time (e.g., 0.2 to 0.3 seconds), the second time constant may correspond to a second range of time (e.g., 2.5 to 4 seconds), and the third time constant may correspond to a third range of time (e.g., 1 to 2 seconds), although the disclosure is not limited thereto.

In some examples, the second time constant may be determined based on a stationarity coefficient. For example, the device 110 may multiply the attack coefficient by a stationarity coefficient. Thus, a lower stationarity coefficient corresponds to less stationarity, resulting in slower level tracking. Details about calculating the stationarity coefficient are described in greater detail below with regard to FIGS. 8-9.

As described above with regard to FIG. 1, the device 110 may be configured to improve noise estimation while performing noise dependent volume control to reduce a sensitivity to voice activity and other non-stationary sounds. For example, the device 110 may adaptively increase a volume level of playback audio based on an amount of ambient noise present in a noisy environment, with an amount of noise compensation determined based on an estimated noise level. To avoid overestimating the noise level during periods of voice activity (e.g., speech), loud transient sounds (e.g., slamming doors, coughing), and/or residual acoustic echo, the device 110 may adaptively slow a noise tracking speed for non-stationary signals. For example, the device 110 may extract features (e.g., short-term dynamic range and mean relative deviation of power spectrum centroid) that distinguish between stationary signals and non-stationary signals and calculate a stationarity coefficient to adaptively control noise estimation. In some examples, the device 110 may use a normal noise tracking speed for stationary signals and a slower noise tracking speed for non-stationary signals.

Figure 8:
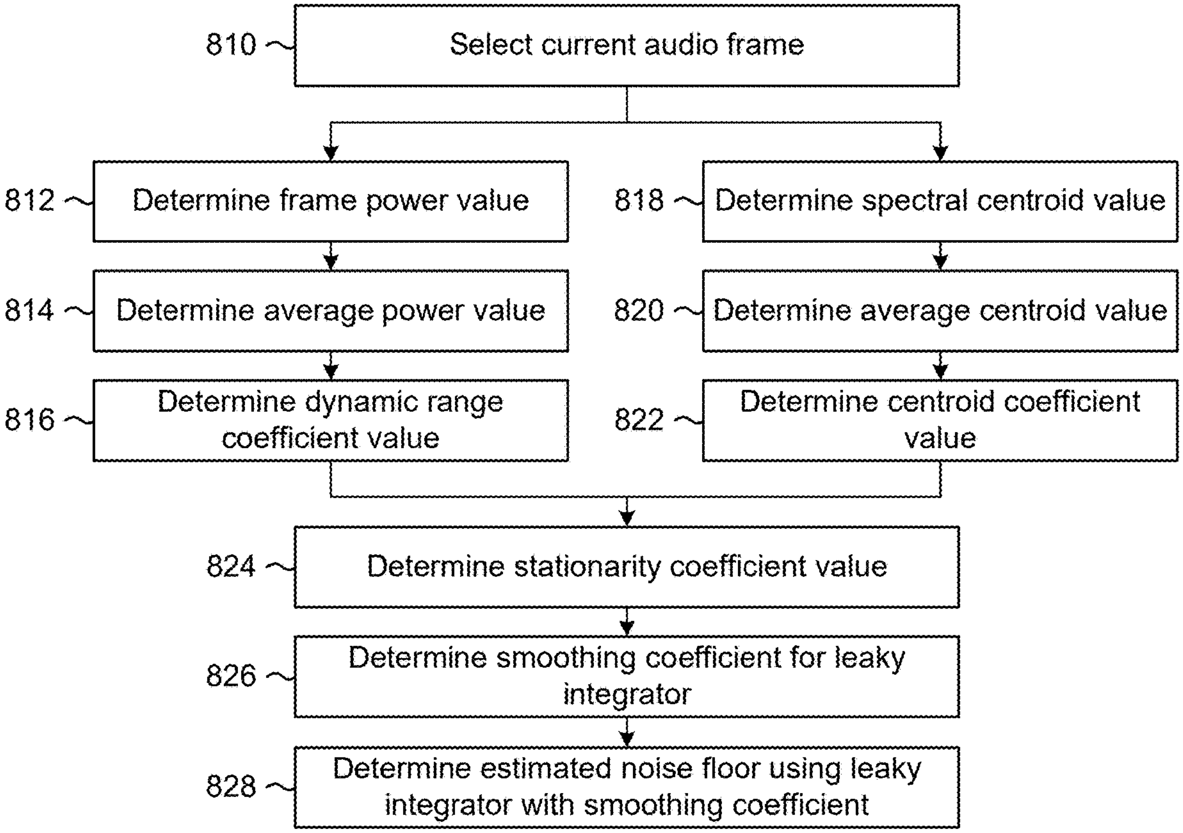
FIG. 8 is a flowchart conceptually illustrating an example method for estimating a noise floor using a stationarity coefficient according to examples of the present disclosure.

FIG. 8 is a flowchart conceptually illustrating an example method for estimating a noise floor using a stationarity coefficient according to examples of the present disclosure. As described above, the goal is to track a level of ambient noise that is in the background of other signals, such as speech (e.g., conversation), transients (e.g., door slamming, coughing, etc.), and/or residual echo after performing acoustic echo cancellation. As used herein, pseudo-stationary noise is defined as a signal having the following two characteristics:

1. Constant signal level
2. Constant spectral distribution

Typical ambient noise signals (e.g., such as those produced by fans, vacuum cleaners, blenders, traffic, cooking noises, and/or the like) tend to have slowly-varying level and spectrum. Speech and music, on the other hand, show a larger variation in these characteristics.

As illustrated in FIG. 8, the device 110 may select (810) a current audio frame from a series of audio frames (e.g., first audio data) and perform feature extraction. An important design consideration is that the stationarity features be agnostic to absolute signal level. Thus, the resulting stationarity coefficient should not vary if a constant gain is applied to the signal. To address the two characteristics mentioned above, the device 110 may define two features:

(i) Short-Term Dynamic Range (ii) Average Spectral Centroid Relative Deviation (e.g., Mean Relative Deviation of the Power Spectrum Centroid)

The short-term dynamic range tends to be smaller for sustained noises with slowly-varying level, while larger for speech and other non-stationary signals such as residual echo (e.g., which is typically music or speech content). In this context, "short-term" corresponds to a first time range (e.g., 0.5 to 1 seconds), and the dynamic range is calculated as the average deviation from mean power level, measured in dB. For each processing frame n, the device 110 may calculate the dynamic range as the running average of the frame level deviation with respect to signal mean level. For example, the device 110 may determine (812) a frame power value associated with the current audio frame, may determine (814) an average power value associated with the series of audio frames (e.g., subset of the first audio data corresponding to a fixed time window), and may determine (816) a dynamic range coefficient value using the frame power value and the average power value. These steps will be described in greater detail with reference to the equations illustrated in FIG. 9.

Similar to the adaptive smoothing coefficient $\alpha_N$ described above, the device 110 may determine a mean power value using a power smoothing coefficient $\alpha_P$ 910, which may be calculated from a specified smoothing time constant as:

$$\alpha_P = 1 - e^{-(N_F/(\tau_P \cdot f_s))} \quad [3]$$

where $N_F$ indicates the frame length (e.g., number of audio samples in a processing frame), $\tau_P$ indicates a first time constant associated with power smoothing, and $f_s$ indicates the sampling rate. In addition, the device 110 may determine the short-term dynamic range using a dynamic range smoothing coefficient $\alpha_{DR}$ 912:

$$\alpha_{DR} = 1 - e^{-(N_F/(\tau_{DR} \cdot f_s))} \quad [4]$$

where $N_F$ indicates the frame length (e.g., number of audio samples in a processing frame), $\tau_{DR}$ indicates a second time constant associated with dynamic range smoothing, and $f_s$ indicates the sampling rate.

In step 812, the device 110 may determine a frame power value 920:

$$P(n) = \frac{|X(n)|^2}{N_F} \quad [5]$$

where X(n) indicates an energy value associated with a current audio frame and $N_F$ indicates the frame length (e.g., number of audio samples in the audio frame). Thus, the power at frame n is equal to a sum of spectral bins squared, divided by the number of samples $N_F$.

In step 814, the device 110 may use the frame power value P(n) 920 to determine an average power value. For example, the device 110 may calculate a mean power value 922:

$$\bar{P}(n) = \bar{P}(n-1) + \alpha_P\left(P(n) - \bar{P}(n-1)\right) \quad [6]$$

where P(n) indicates the mean power value for a current frame (e.g., n), P(n−1) indicates the mean power value for a previous frame (e.g., n−1), $\alpha_P$ indicates the power smoothing coefficient 910 calculated using Equation [3], and P(n) indicates the frame power value 920 calculated using Equation [5].

The frame power value 920 can be converted to decibels to determine a frame power value (dB) 924:

$$P_{dB}(n) = 10\log_{10}(P(n)) \quad [7]$$

Similarly, the mean power value 922 can be converted to decibels to determine a mean power value (dB) 926:

$$\overline{P}_{dB}(n) = 10\log_{10}(\overline{P}(n)) \quad [8]$$

For each audio frame n, the device 110 may calculate a frame level deviation from mean 930:

$$\Delta_P(n) = |P_{dB}(n) - \overline{P}_{dB}(n)| \quad [9]$$

After calculating the frame level deviation from mean 930 (e.g., $\Delta_P$(n)), the device 110 may calculate the Short-Term Dynamic Range 932 as a running average of the frame level deviation:

$$DR(n) = DR(n-1) + \alpha_{DR}(\Delta_P(n) - DR(n-1)) \quad [10]$$

where DR(n) indicates a dynamic range value for a current frame (e.g., n), DR(n−1) indicates a dynamic range value for a previous frame (e.g., n−1), $\alpha_{DR}$ indicates the dynamic range smoothing coefficient 912 calculated using Equation [4], and $\Delta_P$(n) indicates the frame level deviation from mean 930 calculated using Equation [9]. In step 816, the device 110 may use the dynamic range value calculated using Equation [10] to determine the dynamic range coefficient value. For example, the device 110 may normalize the dynamic range within a range from zero to one, although the disclosure is not limited thereto. Referring back to FIG. 8, the device 110 may determine (818) a spectral centroid value associated with the current audio frame, may determine (820) an average centroid value associated with the series of audio frames (e.g., subset of the first audio data corresponding to a fixed time window), and may determine (822) a centroid coefficient value using the spectral centroid value and the average centroid value.

As illustrated in FIG. 9, the device 110 may determine a mean spectral centroid using a centroid smoothing coefficient $\alpha_C$ 914, which may be calculated from a specified smoothing time constant as:

$$\alpha_C = 1 - e^{-(N_F/(\tau_C \cdot f_s))} \quad [11]$$

where $N_F$ indicates the frame length (e.g., number of audio samples in a processing frame), $\tau_C$ indicates a third time constant associated with centroid smoothing, and $f_s$ indicates the sampling rate. In addition, the device 110 may determine the average spectral centroid relative deviation using a centroid deviation smoothing coefficient $\alpha_{\Delta C}$ 916:

$$\alpha_{\Delta C} = 1 - e^{-(N_F/(\tau_{\Delta C} \cdot f_s))} \quad [12]$$

where $N_F$ indicates the frame length (e.g., number of audio samples in a processing frame), $\tau_{\Delta C}$ indicates a fourth time constant associated with centroid deviation smoothing, and $f_s$ indicates the sampling rate.

In step 818, the device 110 may determine a spectral centroid 940. For example, the spectral centroid 940 is a feature used to represent the "center of mass" of a sound's frequency spectrum. Thus, the spectral centroid 940 provides a measure of the brightness or timbral quality of a sound, which essentially indicates where most of the energy of the spectrum is concentrated. This is a computationally efficient way to characterize pseudo-stationarity of timbre. Expressing frequency as a frequency index (e.g., using spectral bin scale rather than Hz), the spectral centroid 940 of the power spectrum is defined as:

$$C(n) = \frac{\sum_{k=0}^{K-1} k|X(k)|^2}{\sum_{k=0}^{K-1} |X(k)|^2} \quad [13]$$

where X(k) indicates an energy value associated with a frequency index k. Thus, Equation [13] is weighting each bin by the frequency index k (e.g., bin number) to give a weighted average that indicates a dominant frequency band for the current audio frame n. For example, the dominant frequency band may indicate a center of mass of the frequency spectrum for the current audio frame n.

In step 820, the device 110 may use the spectral centroid 940 to determine an average spectral centroid value. For example, the device 110 may calculate a mean spectral centroid 942:

$$\overline{C}(n) = \overline{C}(n-1) + \alpha_C(C(n) - \overline{C}(n-1)) \quad [14]$$

where $\overline{C}$(n) indicates the mean spectral centroid value for a current frame (e.g., n), $\overline{C}$(n−1) indicates the mean spectral centroid value for a previous frame (e.g., n−1), $\alpha_C$ indicates the centroid smoothing coefficient 914 calculated using Equation [111], and C(n) indicates the spectral centroid 940 calculated using Equation [13].

For each audio frame n, the device 110 may calculate a spectral centroid deviation relative to mean 950:

$$\Delta_C(n) = \left|\frac{C(n) - \overline{C}(n)}{\overline{C}(n)}\right| \quad [15]$$

After calculating the spectral centroid deviation relative to mean 950 (e.g., $\Delta_C$(n)), the device 110 may calculate the Average Spectral Centroid Relative Deviation 952 as a running average of the spectral centroid deviation relative to mean 950:

$$\overline{\Delta}_C(n) = \overline{\Delta}_C(n-1) + \alpha_{\Delta C}(\Delta_C(n) - \overline{\Delta}_C(n-1)) \quad [16]$$

where $\overline{\Delta}_C$(n) indicates an average spectral centroid relative deviation 952 for a current frame (e.g., n), $\overline{\Delta}_C$(n−1) indicates an average spectral centroid relative deviation 952 for a previous frame (e.g., n−1), $\alpha_{\Delta C}$ indicates the centroid deviation smoothing coefficient 916 calculated using Equation [12], and $\Delta_C$(n) indicates the spectral centroid deviation relative to mean 950 calculated using Equation [15]. In step 822, the device 110 may use the average spectral centroid relative deviation 952 calculated using Equation [16] to determine the centroid coefficient value. For example, the device 110 may normalize the centroid coefficient value within a range from zero to one, although the disclosure is not limited thereto.

Referring back to FIG. 8, the device 110 may determine (824) a stationarity coefficient value $\beta_S$ using the dynamic range coefficient value $\beta_{DR}$ and the centroid coefficient value $\beta_C$. For example, the device 110 may calculate the stationarity coefficient value $\beta_S$ using the following equation:

$$\beta_S = |0.5(\beta_C + \beta_{DR})|^2 \quad [17]$$

As illustrated in Equation [17], in some examples the dynamic range coefficient value $\beta_{DR}$ and the centroid coefficient value $\beta_C$ are averaged and then squared to calculate the stationarity coefficient value $\beta_S$. For example, the square power used in Equation [17] is chosen in order to expand lower values in the [0,1] interval, which produces better level tracking results. However, the disclosure is not limited thereto, and in other examples the stationarity coefficient value $\beta_S$ may be equal to an average of the dynamic range coefficient value $\beta_{DR}$ and the centroid coefficient value $\beta_C$ raised to any power without departing from the disclosure. For example, the stationarity coefficient value $\beta_S$ can be equal to the average itself (e.g., average raised to a power of 1), to a cube of the average (e.g., average raised to a power of 3), and/or the like without departing from the disclosure. Additionally or alternatively, while the examples described above refer to calculating the stationarity coefficient value $\beta_S$ by taking an average of the dynamic range coefficient value $\beta_{DR}$ and the centroid coefficient value $\beta_C$, the disclosure is not limited thereto and the device 110 may calculate the stationarity coefficient value $\beta_S$ using other techniques without departing from the disclosure. For example, the stationarity coefficient value $\beta_S$ may be calculated using the dynamic range coefficient value $\beta_{DR}$, the centroid coefficient value $\beta_C$, and/or a combination thereof (e.g., weighted sum or the like) without departing from the disclosure.

Using the stationarity coefficient value, the device 110 may determine (826) a smoothing coefficient for a leaky integrator and may determine (828) an estimated noise floor using the leaky integrator with the smoothing coefficient value. For example, the device 110 may multiply the time constant determined in FIG. 7 by the stationarity coefficient value, although the disclosure is not limited thereto.

While the example described above illustrates one technique to calculate the stationarity coefficient value, the disclosure is not limited thereto. Instead, the device 110 may calculate the stationarity coefficient value as a posterior probability without departing from the disclosure. For example, the device 110 may define the stationarity coefficient as the posterior probability of the signal being stationary at a given processing frame. This can be obtained via a sequential Bayesian model such as a Hidden Markov Model (HMM). The HMM models the sequence of processing frames as a sequence of hidden states, with two states possible, namely stationary or non-stationary signal. Thus, the HMM models capture the joint distribution of observed sequences and hidden states, and applies Bayesian principles to update beliefs about these states based on observed data.

The observation probability distribution (PDF) for each of the two states is learned from a data training set. The state transition probabilities between consecutive frames (stationary to stationary, stationary to non-stationary, non-stationary to stationary and non-stationary to non-stationary) is also learned from a data training set with known transitions between stationary and non-stationary sections. The HMM outputs the posterior probability of each given frame being stationary, given a sequence of frames of specified duration. Thus, the posterior probability is a quantity in the [0, 1] interval that can be used as a stationary coefficient for the noise level tracker.

To explain this differently, the features can be interpreted as observations in a state. Thus, for any processing frame, the device 110 may determine a corresponding state (e.g., stationary or non-stationary), resulting in a sequence of states corresponding to a sequence of audio frames. At each state, the device 110 may determine two observations, which correspond to two feature values. From these observations, the device 110 may determine a probability distribution indicating a probability associated with transitioning from stationary to non-stationary or from non-stationary to stationary. For example, the device 110 may calculate a posterior probability of the signal being stationary at each frame using the HMM models described above.

Figure 10:
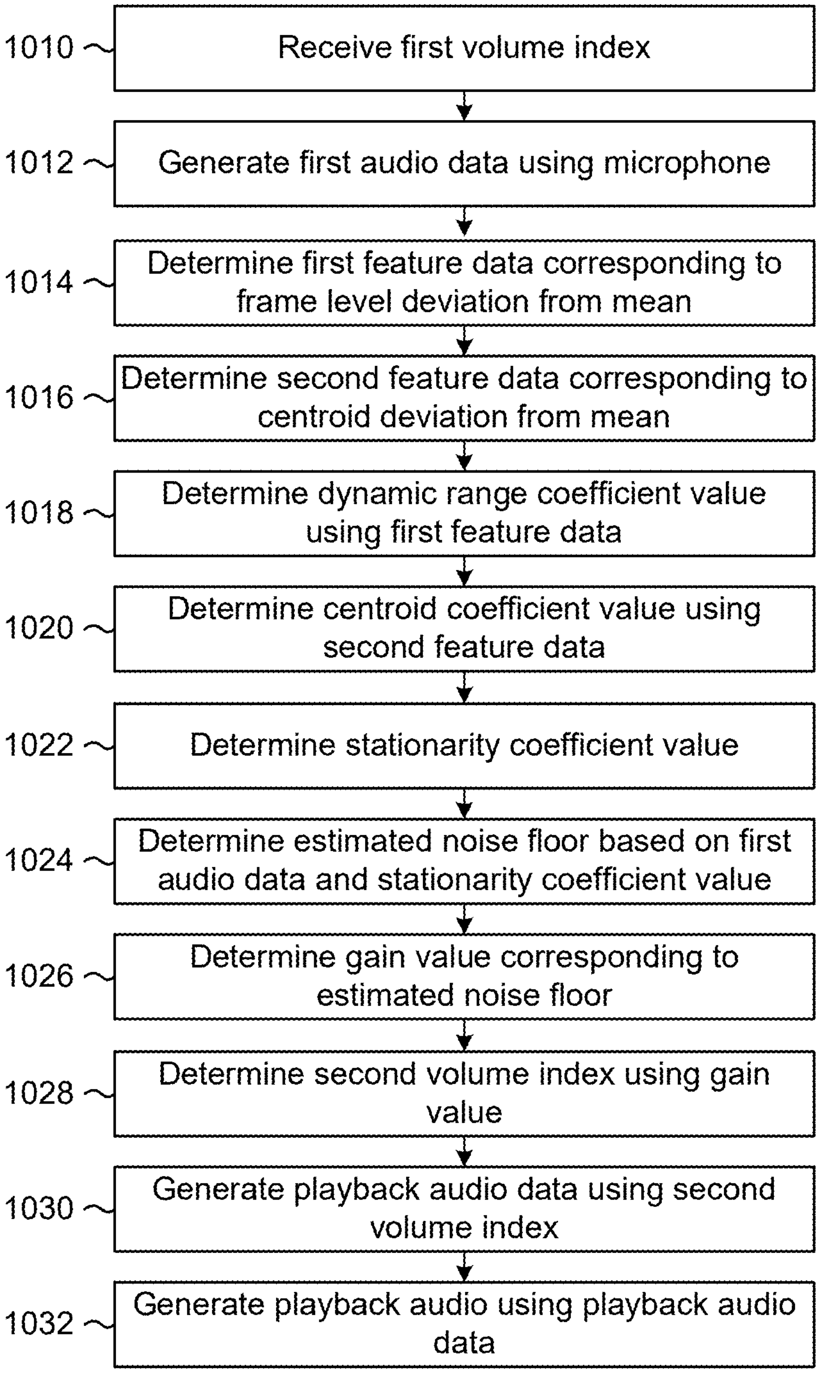
FIG. 10 is a flowchart conceptually illustrating an example method for performing noise dependent volume control using a stationarity coefficient according to examples of the present disclosure.

FIG. 10 is a flowchart conceptually illustrating an example method for performing noise dependent volume control using a stationarity coefficient according to examples of the present disclosure. As illustrated in FIG. 10, the device 110 may receive (1010) a first volume index associated with playback audio and may generate (1012) first audio data using the microphone(s). In some examples, the device 110 may perform echo cancellation using the first audio data to generate isolated audio data and then may determine a plurality of energy values using particular frequency range(s) of interest within the isolated audio data, although the disclosure is not limited thereto.

As illustrated in FIG. 10, the device 110 may determine (1014) first feature data corresponding to a frame level deviation from the mean and may determine (1016) second feature data corresponding to a centroid deviation from the mean, as described in greater detail above with regard to FIG. 9. Thus, the device 110 may extract features (e.g., short-term dynamic range and mean relative deviation of power spectrum centroid) that distinguish between stationary and non-stationary signals. For example, the device 110 may use the equations illustrated in FIG. 9 to calculate the frame level deviation from mean 930 and/or the spectral centroid deviation relative to mean 950 for a plurality of audio frames.

The device 110 may determine (1018) a dynamic range coefficient value using the first feature data and may determine (1020) a centroid coefficient value using the second feature data, as described in greater detail above with regard to FIG. 9. For example, the device 110 may calculate the dynamic range coefficient value using the first feature data and the short-term dynamic range 932 and may calculate the centroid coefficient value using the second feature data and the average spectral centroid relative deviation 952, although the disclosure is not limited thereto. While not illustrated in FIG. 10, in some examples the device 110 may perform normalization to determine the dynamic range coefficient value and/or the centroid coefficient value, such that the normalized coefficient values are within a first range (e.g., from 0 to 1).

Using the dynamic range coefficient value and the centroid coefficient value, the device 110 may determine (1022) a stationarity coefficient value, which the device 110 may use to adaptively control the noise estimation, as described in greater detail above with regard to FIG. 9. For example, the device 110 may determine a first value by averaging the dynamic range coefficient value and the centroid coefficient value and may determine the stationarity coefficient value by squaring the first value, although the disclosure is not limited thereto.

The device 110 may determine (1024) an estimated noise floor based on the first audio data and the stationarity coefficient value, as described in greater detail above with regard to FIG. 9. In some examples, the device 110 may include leaky integrator(s) configured to determine the estimated noise floor using the plurality of energy values. For example, a leaky integrator may be configured to apply a slow attack time constant and a fast release time constant in order to track an estimated noise floor value that represents a lower energy portion of the plurality of energy values. Additionally or alternatively, the leaky integrator may use a normal noise tracking speed for stationary signals (e.g., when the stationarity coefficient value exceeds a threshold value) and a slower noise tracking speed for non-stationary signals (e.g., when the stationarity coefficient value is below the threshold value), although the disclosure is not limited thereto.

The device 110 may determine (1026) a gain value corresponding to the estimated noise floor. For example, the device 110 may determine a noise reference value and may determine the gain value based on a difference between the estimated noise floor value and the noise reference value, as described in greater detail above with regard to FIG. 6. After determining the gain value, the device 110 may determine (1028) a second volume index using the gain value. In some examples, the device 110 may determine the second volume index (e.g., target volume index) by adding the gain value to the first volume index. However, the disclosure is not limited thereto, and the device 110 may determine that a sum of the first volume index and the gain value exceeds a maximum volume level and set the second volume index equal to the maximum volume level without departing from the disclosure. Additionally or alternatively, the device 110 may control a rate at which the volume level changes and/or only perform volume adaptation if a minimum gain threshold value is exceeded.

After determining the second volume index, the device 110 may generate (1030) playback audio data using the second volume index and may generate (1032) playback audio using the playback audio data. For example, the device 110 may receive second audio data to output and the device 110 may generate the playback audio data by applying the second volume index to the second audio data, although the disclosure is not limited thereto. Thus, the second volume index may correspond to an updated volume setting of the device 110 and the device 110 may use the updated volume setting to generate the playback audio in order to compensate for the ambient noise present in the environment 20.

While not illustrated in FIG. 10, in some examples the device 110 may perform volume control processing, as described in greater detail above with regard to FIG. 4, to control a frequency at which the volume level changes. For example, a hold time may correspond to a first duration of time if the second volume index changes the volume level in the same direction as a previous volume level change, and the device 110 may only perform volume adaptation if the first duration of time has elapsed since the previous volume level change. Additionally or alternatively, the hold time may correspond to a second duration of time if the second volume index changes the volume in an opposite direction as the previous volume level change, and the device 110 may only perform volume adaptation if the second duration of time has elapsed since the previous volume level change. Thus, the device 110 may prevent any volume changes for the first duration of time and may prevent the volume change from reversing for the second duration of time, although the disclosure is not limited thereto.

Figure 11A:
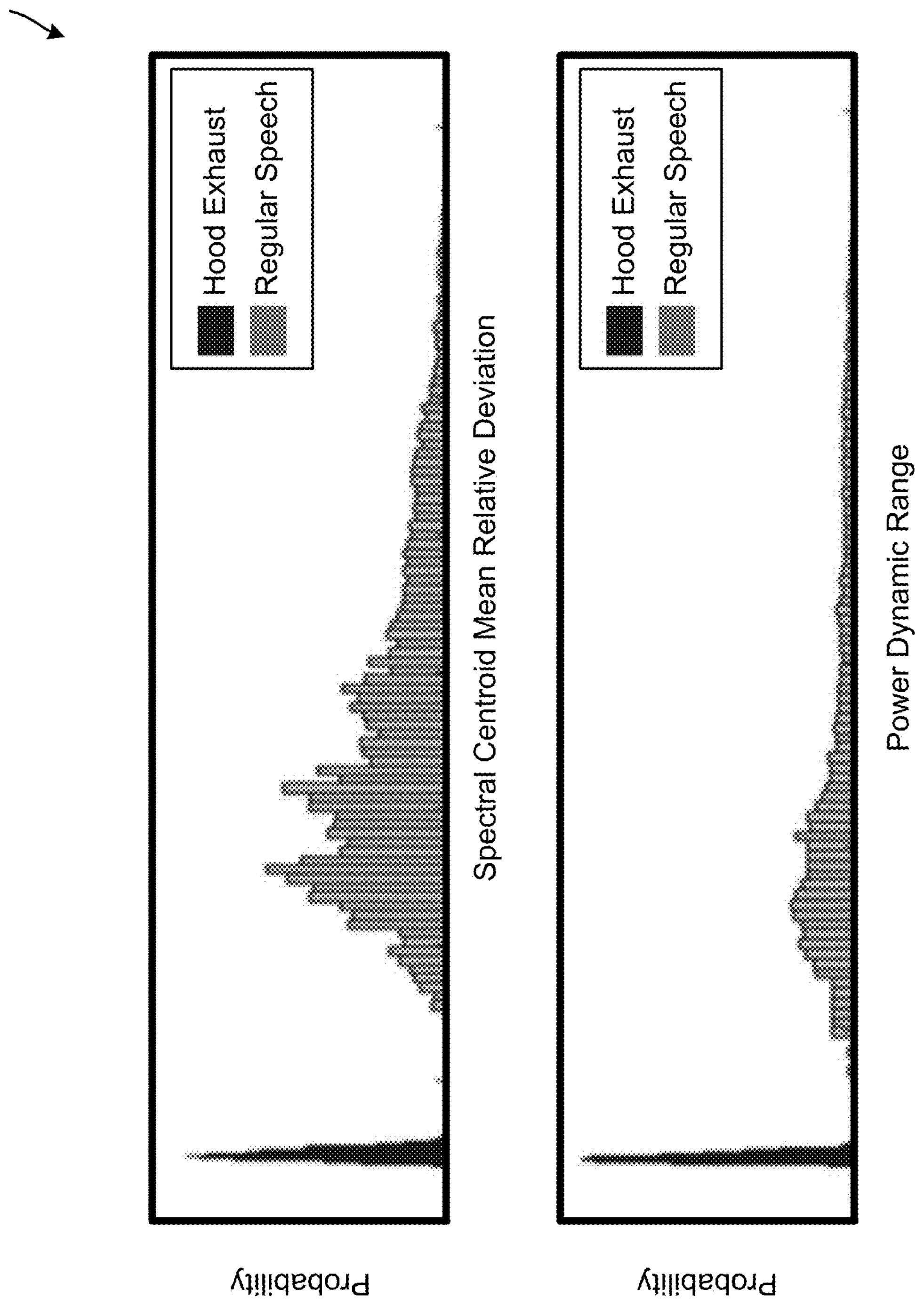
FIGS. 11A-11C illustrate examples of using features to distinguish between a stationary signal and a non-stationary signal according to embodiments of the present disclosure.
Figure 11B:
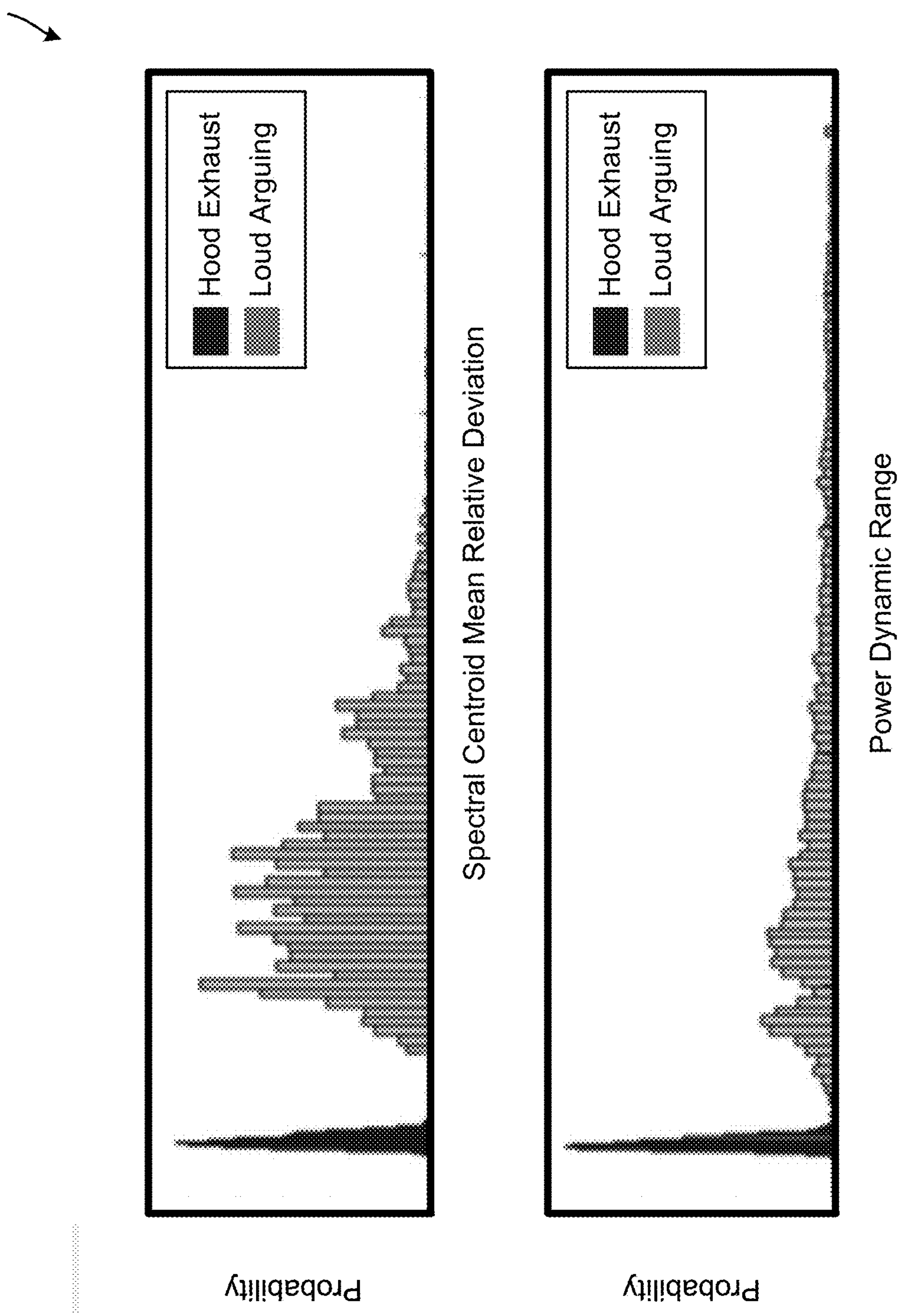
Figure 11C:
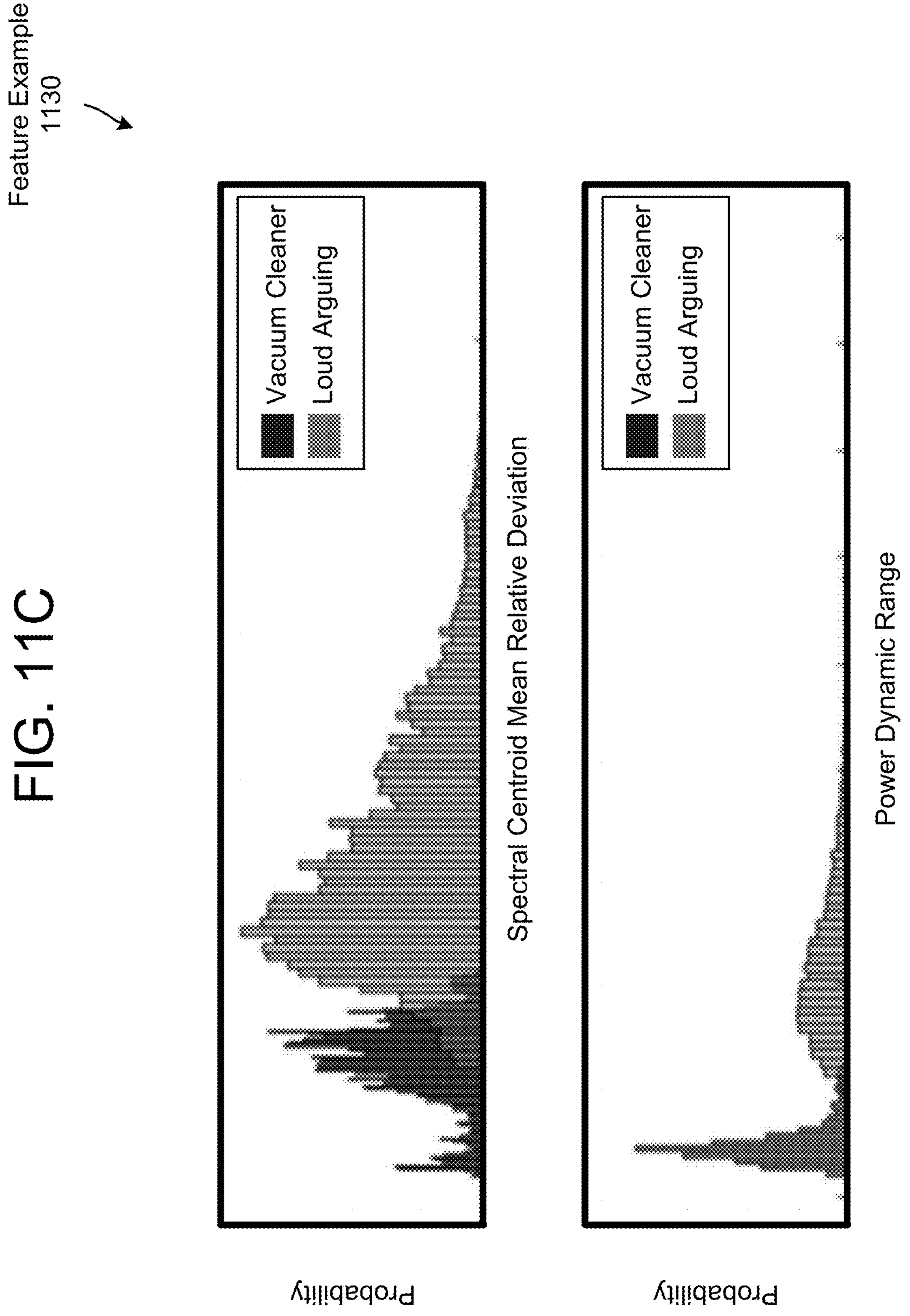

FIGS. 11A-11C illustrate examples of using features to distinguish between a stationary signal and a non-stationary signal according to embodiments of the present disclosure. The experimental histograms illustrated in FIGS. 11A-11C show that the two stationarity features defined above have very different probability distributions for pseudo-stationary versus non-stationary signals. This allows the device 110 to define criteria to discriminate between these two classes, and the noise level tracker component can then adapt its speed depending on the input stationarity feature(s) and/or stationarity coefficient(s).

As illustrated in FIG. 11A, a first feature example 1110 illustrates two probability distributions associated with first feature data (e.g., spectral centroid mean relative deviation) and two probability distributions associated with second feature data (e.g., power dynamic range). For example, a first histogram corresponding to the first feature data (e.g., top chart) illustrates a first probability distribution associated with background noise generated by a kitchen hood exhaust, which is represented in a first color (e.g., blue), and a second probability distribution associated with regular speech, which is represented in a second color (e.g., orange). Similarly, a second histogram corresponding to the second feature data (e.g., bottom chart) illustrates a third probability distribution associated with the background noise generated by the kitchen hood exhaust, which is represented in the first color (e.g., blue), and a fourth probability distribution associated with the regular speech, which is represented in the second color (e.g., orange).

As illustrated in FIG. 11A, the first probability distribution associated with the kitchen hood exhaust is tightly centered (e.g., relatively narrow distribution) around a first value (e.g., 0.1) and exhibits a relatively high peak. In contrast, the second probability distribution associated with regular speech exhibits a moderate peak that is not tightly grouped (e.g., relatively wide distribution) and begins above a second value (e.g., 0.3). Thus, the first feature data can be used to easily distinguish between stationary and non-stationary signals. For example, the device 110 may process the first feature data (e.g., spectral centroid mean relative deviation) using a first threshold value (e.g., 0.2) to detect stationarity and/or to evaluate a continuous stationarity coefficient, although the disclosure is not limited thereto.

Similarly, the third probability distribution associated with the kitchen hood exhaust is tightly centered (e.g., relatively narrow distribution) around a third value (e.g., 2) and exhibits a relatively high peak. In contrast, the fourth probability distribution associated with regular speech exhibits a relatively low peak that is not tightly grouped (e.g., relatively wide distribution) and begins above a fourth value (e.g., 4). Thus, the second feature data can also be used to easily distinguish between stationary and non-stationary signals. For example, the device 110 may process the second feature data (e.g., power dynamic range) using a second threshold value (e.g., 2.5) to detect stationarity and/or to evaluate a continuous stationarity coefficient, although the disclosure is not limited thereto.

As illustrated in FIG. 11B, a second feature example 1120 illustrates two probability distributions associated with the first feature data (e.g., spectral centroid mean relative deviation) and two probability distributions associated with the second feature data (e.g., power dynamic range). For example, a first histogram corresponding to the first feature data (e.g., top chart) illustrates a first probability distribution associated with background noise generated by a kitchen hood exhaust, which is represented in the first color (e.g., blue), and a second probability distribution associated with loud arguing (e.g., speech during a loud argument), which is represented in the second color (e.g., orange). Similarly, a second histogram corresponding to the second feature data (e.g., bottom chart) illustrates a third probability distribution associated with the background noise generated by the kitchen hood exhaust, which is represented in the first color (e.g., blue), and a fourth probability distribution associated with the loud arguing, which is represented in the second color (e.g., orange).

As illustrated in FIG. 11B, the first probability distribution associated with the kitchen hood exhaust is tightly centered (e.g., relatively narrow distribution) around a first value (e.g., 0.1) and exhibits a relatively high peak. In contrast, the second probability distribution associated with the loud arguing exhibits a moderate peak that is not tightly grouped (e.g., relatively wide distribution) and begins above a second value (e.g., 0.2). Thus, the first feature data can be used to easily distinguish between stationary and non-stationary signals. For example, the device 110 may process the first feature data (e.g., spectral centroid mean relative deviation) using the first threshold value (e.g., 0.2) to detect stationarity and/or to evaluate a continuous stationarity coefficient, although the disclosure is not limited thereto.

Similarly, the third probability distribution associated with the kitchen hood exhaust is tightly centered (e.g., relatively narrow distribution) around a third value (e.g., 2) and exhibits a relatively high peak. In contrast, the fourth probability distribution associated with the loud arguing exhibits a relatively low peak that is not tightly grouped (e.g., relatively wide distribution) and begins above a fourth value (e.g., 3). Thus, the second feature data can also be used to easily distinguish between stationary and non-stationary signals. For example, the device 110 may process the second feature data (e.g., power dynamic range) using a second threshold value (e.g., 2.5) to detect stationarity and/or to evaluate a continuous stationarity coefficient, although the disclosure is not limited thereto.

As illustrated in FIG. 11C, a third feature example 1130 illustrates two probability distributions associated with the first feature data (e.g., spectral centroid mean relative deviation) and two probability distributions associated with the second feature data (e.g., power dynamic range). For example, a first histogram corresponding to the first feature data (e.g., top chart) illustrates a first probability distribution associated with background noise generated by a vacuum cleaner, which is represented in the first color (e.g., blue), and a second probability distribution associated with loud arguing (e.g., speech during a loud argument), which is represented in the second color (e.g., orange). Similarly, a second histogram corresponding to the second feature data (e.g., bottom chart) illustrates a third probability distribution associated with the background noise generated by the vacuum cleaner, which is represented in the first color (e.g., blue), and a fourth probability distribution associated with the loud arguing, which is represented in the second color (e.g., orange).

As illustrated in FIG. 11C, the first probability distribution associated with the vacuum cleaner is loosely grouped (e.g., relatively moderate distribution) around a first value (e.g., 0.2), with multiple peaks. In contrast, the second probability distribution associated with the loud arguing exhibits a relatively large peak that is not tightly grouped (e.g., relatively wide distribution) and begins around the first value. Thus, there is considerable overlap between the first probability distribution and the second probability distribution, such that the first feature data is less useful in distinguishing between stationary and non-stationary signals. However, the device 110 may process the first feature data (e.g., spectral centroid mean relative deviation) using the first threshold value (e.g., 0.2) to detect stationarity and/or to evaluate a continuous stationarity coefficient, although the disclosure is not limited thereto. For example, while the first probability distribution overlaps the second probability distribution above the first value (e.g., from 0.2-0.4), the second probability distribution does not extend below the first value.

As illustrated in FIG. 11C, the third probability distribution associated with the vacuum cleaner is tightly centered (e.g., relatively narrow distribution) around a second value (e.g., 1) and exhibits a relatively high peak. In contrast, the fourth probability distribution associated with the loud arguing exhibits a relatively low peak that is not tightly grouped (e.g., relatively wide distribution) and begins above a third value (e.g., 2). Thus, the second feature data can be used to distinguish between stationary and non-stationary signals. For example, the device 110 may process the second feature data (e.g., power dynamic range) using a second threshold value (e.g., 2) to detect stationarity and/or to evaluate a continuous stationarity coefficient, although the disclosure is not limited thereto.

While the examples above refer to distinguishing between stationary and non-stationary signals by performing thresholding, the disclosure is not limited thereto and the device 110 may distinguish between stationary and non-stationary signals using other techniques without departing from the disclosure.

FIG. 12 illustrates examples of noise estimates generated with and without a stationary coefficient according to embodiments of the present disclosure. In the examples illustrated in FIG. 12, first noise estimation 1210 corresponds to background noise generated by a kitchen hood exhaust (e.g., stationary signal), second noise estimation 1220 corresponds to background noise generated by a vacuum cleaner (e.g., stationary signal), and third noise estimation 1230 corresponds to regular speech.

As illustrated in FIG. 12, the background noise generated by the kitchen hood exhaust (e.g., first noise estimation 1210) is represented by frame level data 1212, which may include a first plurality of frame level values that vary around a first power level (e.g., −20 dB). If the device 110 processes the frame level data 1212 without using a stationarity coefficient, the device 110 may generate a first plurality of noise estimates, represented in FIG. 12 as NDVC estimate 1214. However, if the device 110 processes the frame level data 1212 using the stationarity coefficient, the device 110 may generate a second plurality of noise estimates, represented in FIG. 12 as stationarity NDVC estimate 1216. As the kitchen hood exhaust corresponds to a stationary signal, the stationarity NDVC estimate 1216 is similar to the NDVC estimate 1214 and quickly converges such that the estimated noise floor values are almost identical.

Similarly, the background noise generated by the vacuum cleaner (e.g., second noise estimation 1220) is represented by frame level data 1222, which may include a second plurality of frame level values that vary around a second power level (e.g., −30 dB). If the device 110 processes the frame level data 1222 without using the stationarity coefficient, the device 110 may generate a third plurality of noise estimates, represented in FIG. 12 as NDVC estimate 1224. However, if the device 110 processes the frame level data 1222 using the stationarity coefficient, the device 110 may generate a fourth plurality of noise estimates, represented in FIG. 12 as stationarity NDVC estimate 1226. As the vacuum cleaner corresponds to a stationary signal, the stationarity NDVC estimate 1226 is similar to the NDVC estimate 1224, although it takes a moment for the two plurality of noise estimates to converge.

In contrast, the third noise estimation 1230 corresponds to regular speech, which is a non-stationary signal. As illustrated in FIG. 12, this regular speech is represented by frame level data 1232, which varies wildly (e.g., between −60 dB and −20 dB) depending on whether voice activity is present. If the device 110 processes the frame level data 1232 without using the stationarity coefficient, the device 110 may generate a fifth plurality of noise estimates, represented in FIG. 12 as NDVC estimate 1234. However, if the device 110 processes the frame level data 1232 using the stationarity coefficient, the device 110 may generate a sixth plurality of noise estimates, represented in FIG. 12 as stationarity NDVC estimate 1236. As the regular speech corresponds to a non-stationary signal, the stationarity NDVC estimate 1236 is drastically different than the NDVC estimate 1234. For example, while the NDVC estimate 1234 varies over time depending on how much voice activity is present, the stationarity NDVC estimate 1236 remains flat and effectively ignores the regular speech. This improves a user experience, as the device 110 would generate a constant noise estimate and there would be no volume changes and/or undesired volume compensation during the regular speech.

Figure 13:
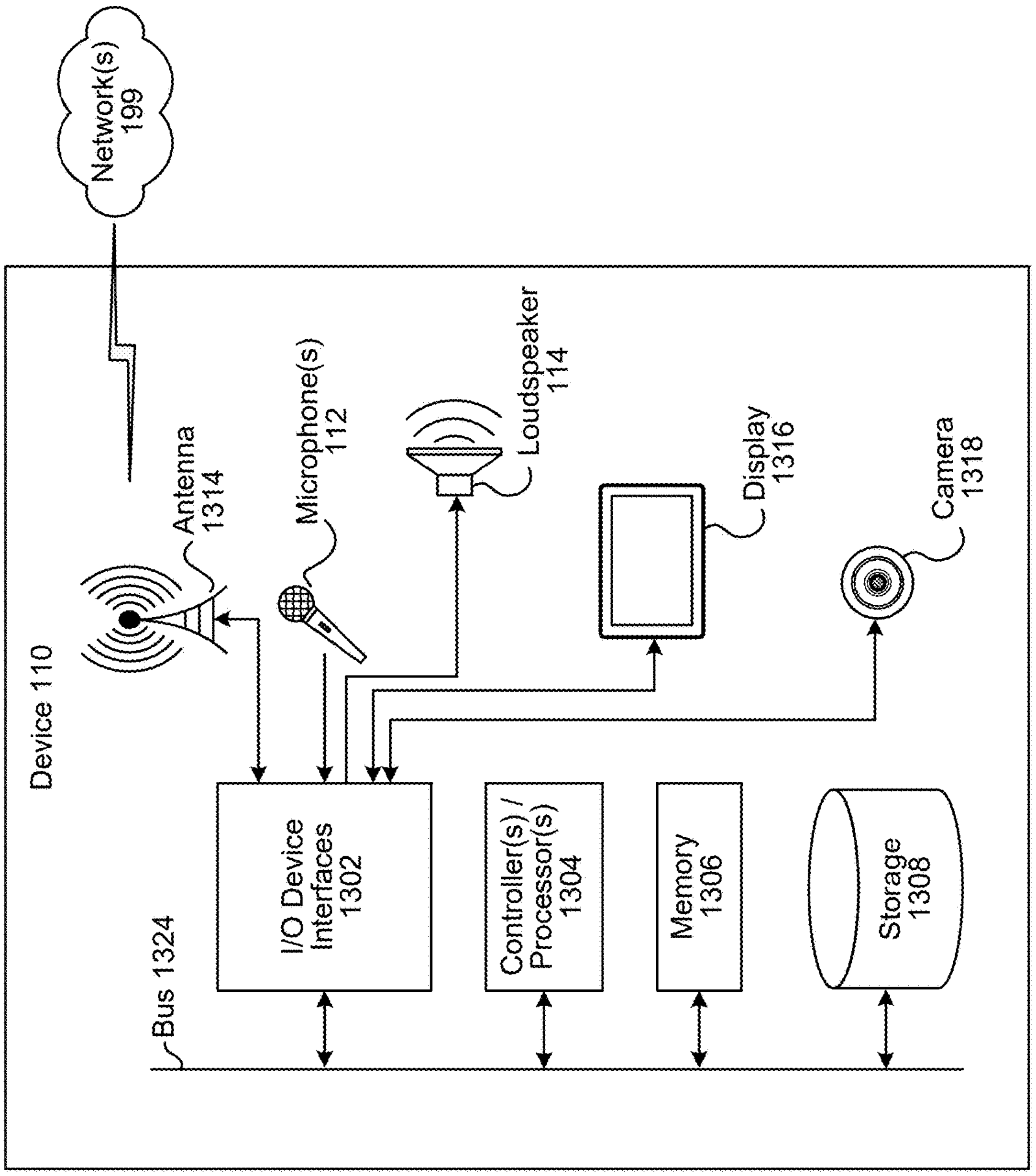
FIG. 13 is a block diagram conceptually illustrating example components of a device according to embodiments of the present disclosure.

FIG. 13 is a block diagram conceptually illustrating a device 110 that may be used with the system. In operation, the system 100 may include computer-readable and computer-executable instructions that reside on the device 110, as will be discussed further below.

The device 110 may include one or more audio capture device(s), such as microphones 112 or an array of microphones. The audio capture device(s) may be integrated into the device 110 or may be separate. The device 110 may also include an audio output device for producing sound, such as loudspeaker(s) 114. The audio output device may be integrated into the device 110 or may be separate. In some examples the device 110 may include a display 1316, but the disclosure is not limited thereto and the device 110 may not include a display or may be connected to an external device/display without departing from the disclosure.

The device 110 may include one or more controllers/processors (1304), which may each include a central processing unit (CPU) for processing data and computer-readable instructions, and a memory (1306) for storing data and instructions of the respective device. The memory (1306) may individually include volatile random access memory (RAM), non-volatile read only memory (ROM), non-volatile magnetoresistive memory (MRAM), and/or other types of memory. The device 110 may also include a data storage component (1308) for storing data and controller/processor-executable instructions. Each data storage component (1308) may individually include one or more non-volatile storage types such as magnetic storage, optical storage, solid-state storage, etc. The device 110 may also be connected to removable or external non-volatile memory and/or storage (such as a removable memory card, memory key drive, networked storage, etc.) through respective input/output device interfaces (1302).

Computer instructions for operating the device 110 and its various components may be executed by the respective device's controller(s)/processor(s) (1304), using the memory (1306) as temporary "working" storage at runtime. A device's computer instructions may be stored in a non-transitory manner in non-volatile memory (1306), data storage component (1308), or an external device(s). Alternatively, some or all of the executable instructions may be embedded in hardware or firmware on the respective device in addition to or instead of software.

The device 110 includes input/output device interfaces (1302). A variety of components may be connected through the input/output device interfaces (1302), such as the microphones 112, the loudspeaker(s) 114, and/or the display 1316. The input/output interfaces (1302) may include A/D converters for converting the output of the microphones 112 into microphone audio data, if the microphones 112 are integrated with or hardwired directly to the device 110. If the microphones 112 are independent, the A/D converters will be included with the microphones 112, and may be clocked independent of the clocking of the device 110. Likewise, the input/output interfaces 1302 may include D/A converters for converting output audio data into an analog current to drive the loudspeaker(s) 114, if the loudspeaker(s) 114 are integrated with or hardwired to the device 110. However, if the loudspeaker(s) 114 are independent, the D/A converters will be included with the loudspeaker(s) 114 and may be clocked independent of the clocking of the device 110 (e.g., conventional Bluetooth loudspeakers).

Additionally, the device 110 may include an address/data bus (1324) for conveying data among components of the respective device. Each component within a device 110 may also be directly connected to other components in addition to (or instead of) being connected to other components across the bus (1324).

Referring to FIG. 13, the device 110 may include input/output device interfaces 1302 that connect to a variety of components such as an audio output component such as loudspeaker(s) 114, a wired headset or a wireless headset (not illustrated), or other component capable of outputting audio. The device 110 may also include an audio capture component. The audio capture component may be, for example, microphones 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content and/or a camera 1318 to capture image data, although the disclosure is not limited thereto. The input/output device interfaces (1302) may also include an interface for an external peripheral device connection such as universal serial bus (USB), FireWire, Thunderbolt or other connection protocol.

The device 110 may connect to one or more network(s) 1399 through either wired and/or wireless connections. For example, the device 110 may connect to the network(s) 1399 via an Ethernet port, through a wireless service provider (e.g., using a WiFi or cellular network connection), over a wireless local area network (WLAN) (e.g., using WiFi or the like), over a wired connection such as a local area network (LAN), and/or the like. The network(s) 1399 may include a local or private network or may include a wide network such as the Internet.

As illustrated in FIG. 13, the input/output device interfaces 1302 may connect to the network(s) 1399 via antenna(s) 1314. For example, the device 110 may connect to the network(s) 1399 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 1399, the system may be distributed across a networked environment. The I/O device interface (1302) may also include communication components that allow data to be exchanged between devices such as different physical servers in a collection of servers or other components.

The components of the device 110 may include their own dedicated processors, memory, and/or storage. Alternatively, one or more of the components of the device 110 may utilize the I/O interfaces (1302), processor(s) (1304), memory (1306), and/or data storage component (1308) of the device 110, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, as described herein, are illustrative, and may be located as a stand-alone device or may be included, in whole or in part, as a component of a larger device or system.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

determining first audio data representing audio captured by a microphone of a device, wherein the audio corresponds to an environment of the device;

determining, using the first audio data, first feature data, wherein a first feature value of the first feature data is associated with a first audio frame of the first audio data and indicates a first difference value between a power value of the first audio frame and an average power value;

determining, using the first audio data, second feature data, wherein a second feature value of the second feature data is associated with the first audio frame and indicates a second difference value between a spectral centroid value of the first audio frame and an average spectral centroid value;

determining, using the first feature data, a first dynamic range value associated with the first audio frame;

determining, using the second feature data, a first centroid deviation value associated with the first audio frame;

determining, using the first dynamic range value and the first centroid deviation value, a first stationarity coefficient value, wherein the first stationarity coefficient value indicates whether noise represented in the first audio data is stationary; and processing the first audio data using the first stationarity coefficient value to determine an estimated noise level corresponding to noise in the environment.

2. The computer-implemented method of claim 1, further comprising:

receiving a first volume value corresponding to an output volume setting of the device;

determining, using the estimated noise level, a noise compensation value;

determining, using the first volume value and the noise compensation value, a second volume value corresponding to the output volume setting of the device; and generating output audio using the second volume value.

3. The computer-implemented method of claim 1, further comprising:

determining, using the first feature data, a second dynamic range value associated with a second audio frame of the first audio data;

determining, using the second feature data, a second centroid deviation value associated with the second audio frame;

determining, using the second dynamic range value and the second centroid deviation value, a second stationarity coefficient value;

determining that the second stationarity coefficient value is higher than the first stationarity coefficient value; and in response to determining that the second stationarity coefficient value is higher than the first stationarity coefficient value, increasing a tracking speed associated with determining the estimated noise level.

4. The computer-implemented method of claim 1, further comprising:

determining, using the first feature data, a second dynamic range value associated with a second audio frame of the first audio data;

determining, using the second feature data, a second centroid deviation value associated with the second audio frame;

determining, using the second dynamic range value and the second centroid deviation value, a second stationarity coefficient value;

determining that the second stationarity coefficient value is lower than the first stationarity coefficient value; and in response to determining that the second stationarity coefficient value is lower than the first stationarity coefficient value, decreasing a tracking speed associated with determining the estimated noise level.

5. A computer-implemented method, the method comprising:

determining, at an electronic device based on first audio data generated using a microphone of the electronic device, a dynamic range value indicating power level deviation for at least a portion of the first audio data;

determining, using the first audio data, a spectral centroid value indicating deviation from a power spectrum centroid corresponding to a frequency range of energy concentration;

determining, using the dynamic range value and the spectral centroid value, a first estimated noise level;

determining, using a first volume value and the first estimated noise level, a second volume value; and outputting audio using the second volume value.

6. The computer-implemented method of claim 5, further comprising:

determining, using the first estimated noise level and a first noise reference value, a noise compensation value;

determining a first gain value using the noise compensation value; and determining, using the first volume value and the first gain value, the second volume value corresponding to an output volume setting of the electronic device.

7. The computer-implemented method of claim 5, further comprising:

determining, using the first audio data, a power value of a first audio frame of the first audio data;

determining, using the first audio data and the power value, an average power value;

determining a first difference value between the power value and the average power value, wherein the dynamic range value is determined using the first difference value;

determining, using the first audio data, a power spectrum centroid value of the first audio frame;

determining, using the first audio data and the power spectrum centroid value, an average spectral centroid value; and determining a second difference value between the spectral centroid value and the average spectral centroid value, wherein the spectral centroid value is determined using the second difference value.

8. The computer-implemented method of claim 5, further comprising:

determining, using the dynamic range value, a dynamic range coefficient value;

determining, using the spectral centroid value, a centroid coefficient value;

determining a first value representing an average of the dynamic range coefficient value and the centroid coefficient value; and determining a first coefficient value by squaring the first value, wherein the first estimated noise level is determined based on the first coefficient value.

9. The computer-implemented method of claim 5, further comprising:

determining, using the dynamic range value and the spectral centroid value, a first coefficient value, wherein the first estimated noise level is determined based on the first coefficient value and a first tracking speed;

determining a second coefficient value associated with a second audio frame of the first audio data;

determining that the second coefficient value is higher than the first coefficient value; and in response to determining that the second coefficient value is higher than the first coefficient value, determining a second estimated noise level using a second tracking speed that is faster than the first tracking speed.

10. The computer-implemented method of claim 5, further comprising:

determining, using the dynamic range value and the spectral centroid value, a first coefficient value, wherein the first estimated noise level is determined based on the first coefficient value and a first tracking speed;

determining a second coefficient value associated with a second audio frame of the first audio data;

determining that the second coefficient value is lower than the first coefficient value; and in response to determining that the second coefficient value is lower than the first coefficient value, determining a second estimated noise level using a second tracking speed that is slower than the first tracking speed.

11. The computer-implemented method of claim 5, wherein the determining of the dynamic range value comprises:

processing the first audio data to determine a plurality of power values, a first power value indicating an amount of power associated with a first audio frame of the first audio data;

determining, using the plurality of power values and a first leaky integrator, an average power value corresponding to the first audio frame;

determining a difference value between the first power value and the average power value; and determining, using the difference value and a second leaky integrator, the dynamic range value.

12. The computer-implemented method of claim 5, wherein the determining of the spectral centroid value comprises:

processing the first audio data to determine a plurality of spectral centroid values, a first spectral centroid value indicating a center of mass of a frequency spectrum of a first audio frame of the first audio data;

determining, using the plurality of spectral centroid values and a first leaky integrator, an average spectral centroid value corresponding to the first audio frame;

determining a difference value between the first spectral centroid value and the average spectral centroid value; and determining, using the difference value and a second leaky integrator, the spectral centroid value.

13. A system comprising:

at least one processor; and memory including instructions operable to be executed by the at least one processor to cause the system to:

determine, at an electronic device based on first audio data generated using a microphone of the electronic device, a dynamic range value indicating power level deviation for at least a portion of the first audio data;

determine, using the first audio data, a spectral centroid value indicating deviation from a power spectrum centroid corresponding to a frequency range of energy concentration;

determine, using the dynamic range value and the spectral centroid value, a first estimated noise level;

determine, using a first volume value and the first estimated noise level, a second volume value; and output audio using the second volume value.

14. The system of claim 13, wherein the memory further comprises instructions that, when executed by the at least one processor, further cause the system to:

determine, using the first estimated noise level and a first noise reference value, a noise compensation value;

determine a first gain value using the noise compensation value; and determine, using the first volume value and the first gain value, the second volume value corresponding to an output volume setting of the electronic device.

15. The system of claim 13, wherein the memory further comprises instructions that, when executed by the at least one processor, further cause the system to:

determine, using the first audio data, a power value of a first audio frame of the first audio data;

determine, using the first audio data and the power value, an average power value;

determine a first difference value between the power value and the average power value, wherein the dynamic range value is determined using the first difference value;

determine, using the first audio data, a power spectrum centroid value of the first audio frame;

determine, using the first audio data and the power spectrum centroid value, an average spectral centroid value; and determine a second difference value between the spectral centroid value and the average spectral centroid value, wherein the spectral centroid value is determined using the second difference value.

16. The system of claim 13, wherein the memory further comprises instructions that, when executed by the at least one processor, further cause the system to:

determine, using the dynamic range value, a dynamic range coefficient value;

determine, using the spectral centroid value, a centroid coefficient value;

determine a first value representing an average of the dynamic range coefficient value and the centroid coefficient value; and determine a first coefficient value by squaring the first value, wherein the first estimated noise level is determined based on the first coefficient value.

17. The system of claim 13, wherein the memory further comprises instructions that, when executed by the at least one processor, further cause the system to:

determine, using the dynamic range value and the spectral centroid value, a first coefficient value, wherein the first estimated noise level is determined based on the first coefficient value and a first tracking speed;

determine a second coefficient value associated with a second audio frame of the first audio data;

determine that the second coefficient value is higher than the first coefficient value; and in response to determining that the second coefficient value is higher than the first coefficient value, determine a second estimated noise level using a second tracking speed that is faster than the first tracking speed.

18. The system of claim 13, wherein the memory further comprises instructions that, when executed by the at least one processor, further cause the system to:

determine, using the dynamic range value and the spectral centroid value, a first coefficient value, wherein the first estimated noise level is determined based on the first coefficient value and a first tracking speed;

determine a second coefficient value associated with a second audio frame of the first audio data;

determine that the second coefficient value is lower than the first coefficient value; and in response to determining that the second coefficient value is lower than the first coefficient value, determine a second estimated noise level using a second tracking speed that is slower than the first tracking speed.

19. The system of claim 13, wherein the memory further comprises instructions that, when executed by the at least one processor, further cause the system to:

process the first audio data to determine a plurality of power values, a first power value indicating an amount of power associated with a first audio frame of the first audio data;

determine, using the plurality of power values and a first leaky integrator, an average power value corresponding to the first audio frame;

determine a difference value between the first power value and the average power value; and determine, using the difference value and a second leaky integrator, the dynamic range value.

20. The system of claim 13, wherein the memory further comprises instructions that, when executed by the at least one processor, further cause the system to:

process the first audio data to determine a plurality of spectral centroid values, a first spectral centroid value indicating a center of mass of a frequency spectrum of a first audio frame of the first audio data;

determine, using the plurality of spectral centroid values and a first leaky integrator, an average spectral centroid value corresponding to the first audio frame;

determine a difference value between the first spectral centroid value and the average spectral centroid value; and determine, using the difference value and a second leaky integrator, the spectral centroid value.

* * * * *